United States Patent [19]
Freeman

[11] Patent Number: 5,574,883
[45] Date of Patent: Nov. 12, 1996

[54] SINGLE CHIP PROCESSING UNIT PROVIDING IMMEDIATE AVAILABILITY OF FREQUENTLY USED MICROCODE INSTRUCTION WORDS

[75] Inventor: Richard D. Freeman, Mission Viejo, Calif.

[73] Assignee: Unisys Corporation, Blue Bell, Pa.

[21] Appl. No.: 159,883

[22] Filed: Nov. 30, 1993

[51] Int. Cl.[6] .............................. G06F 12/00; G06F 13/00
[52] U.S. Cl. .................................... 395/446; 364/DIG. 1; 364/DIG. 2; 364/243.4; 364/243.41; 395/445; 395/450
[58] Field of Search ...................... 395/425, 452, 395/427, 445, 446, 450; 364/DIG. 1, DIG. 2, 243.4, 243.41

[56] References Cited

U.S. PATENT DOCUMENTS

| | | |
|---|---|---|
| 4,719,568 | 1/1988 | Carrubba et al. ........................ 395/425 |
| 4,761,733 | 8/1988 | McCrocklin et al. .................... 364/200 |
| 5,150,469 | 9/1992 | Jouppi ..................................... 395/425 |
| 5,185,878 | 2/1993 | Baror et al. .............................. 395/427 |
| 5,210,842 | 5/1993 | Sood ........................................ 395/425 |
| 5,325,499 | 6/1994 | Kummer et al. ......................... 395/427 |
| 5,455,925 | 10/1995 | Kitahara et al. ......................... 395/449 |

*Primary Examiner*—Tod R. Swann
*Assistant Examiner*—Tuan V. Thai
*Attorney, Agent, or Firm*—Alfred W. Kozak; Mark T. Starr; Steven R. Petersen

[57] ABSTRACT

A multi-cache memory system resides on-chip with a system interface to external memory. A general cache memory holds frequently used data and OPCODES for delivery to a processor in one clock cycle. A microcode cache holds frequently used microcode instruction words for delivery to the processor in one clock cycle. Both general and microcode cache memories operate to replace less frequently used OPCODES, data words, and microcode instruction words, with more frequently used words.

8 Claims, 15 Drawing Sheets

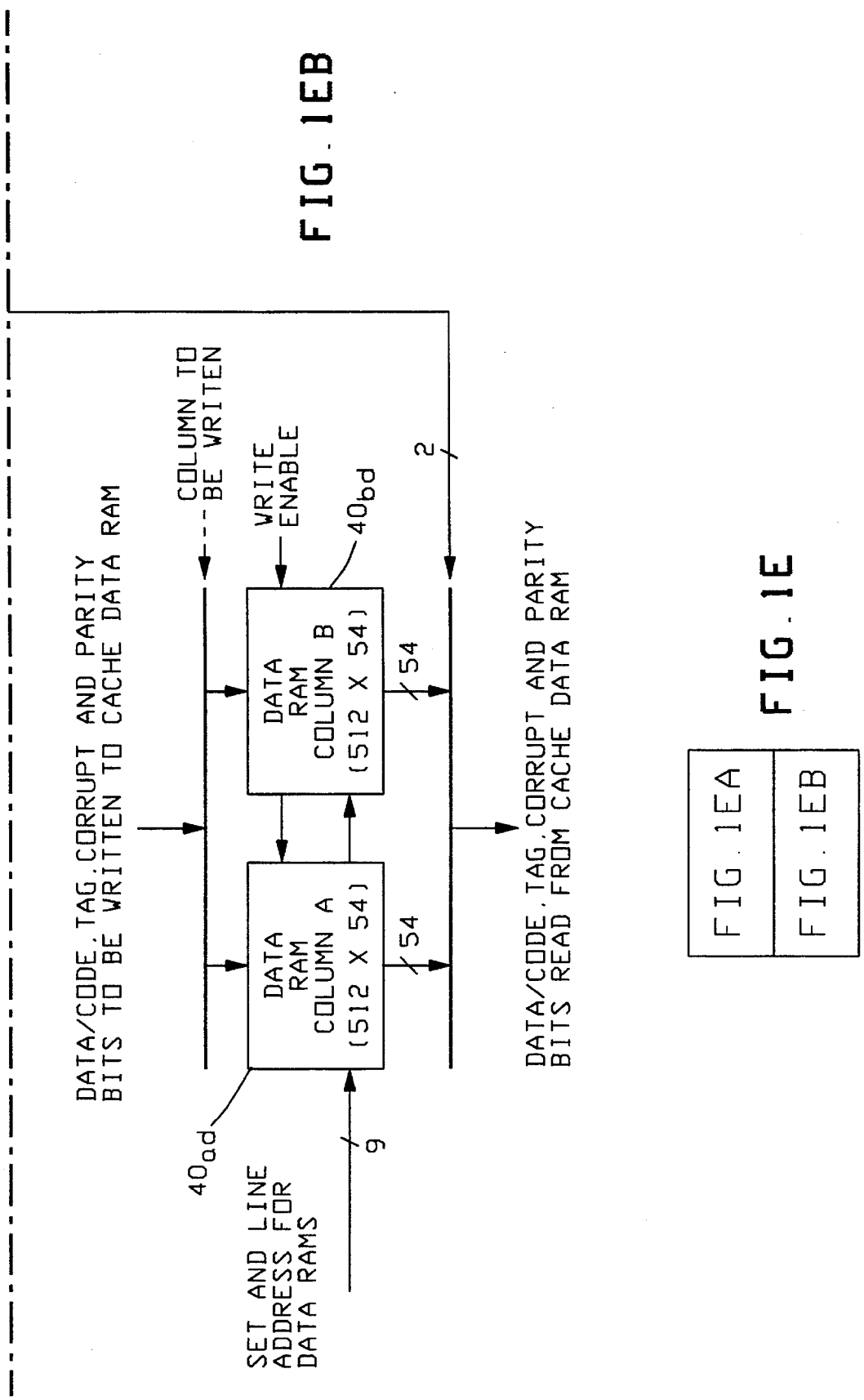

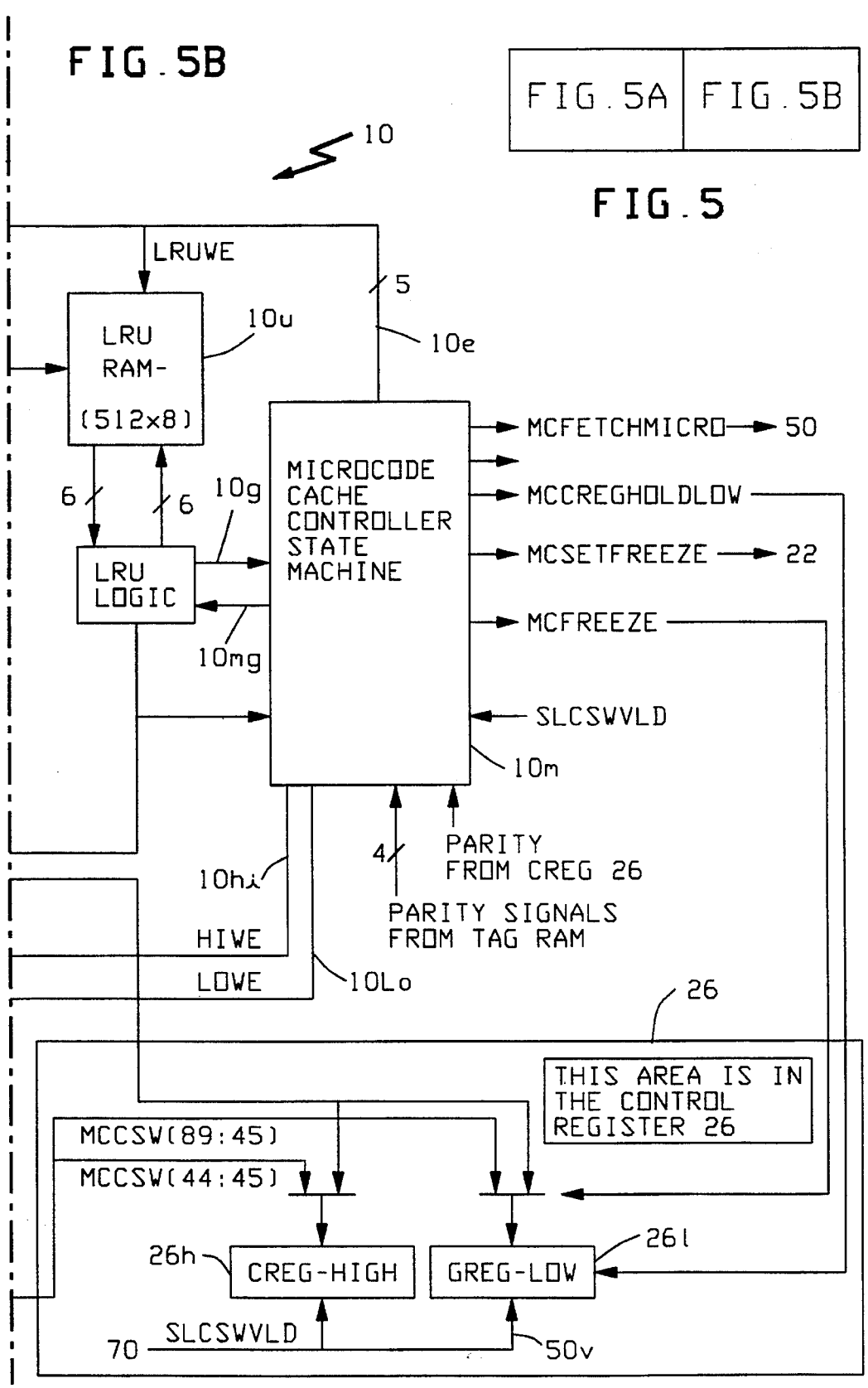

SINGLE CHIP PROCESSING UNIT PROVIDING IMMEDIATE AVAILABILITY OF FREQUENTLY USED MICROCODE INSTRUCTION WORDS

FIELD OF THE INVENTION

This disclosure relates to processing systems using multiple on-chip cache memories to enhance speed of access for data words and microcode instruction words.

CROSS REFERENCES TO RELATED APPLICATIONS

This application is related to co-pending applications U.S. Ser. No. 08/081,048 entitled "Enhanced Computer Operational System Using Auxiliary Mini-Cache", filed Jun. 22, 1993 and U.S. Ser. No. 159,683 entitled "Microcode Cache Subsystem" filed Nov. 30, 1993.

BACKGROUND OF THE INVENTION

A basic problem occurring in digital system design is that of how to speed-up throughput and reduce the delays involved in providing processor access to memory data and instructions. The performance of the system is of course, dependent on the best or higher speed of access to memory data and thus is reduced by the liability of any delays that a processor would have to access data or instructions.

The presently described computing system with multiple cache functionality deals with architecture and functions for reducing the memory access time, reducing time for completion of read, write, or other operations and thus increasing the throughput efficiency.

Typically, one technique to reduce memory cycle time is that of using a cache memory which is attached to or adjacent to the processing unit. The adjacent cache memory has generally a high-speed fast memory data access cycle and functions to hold the more frequently used data so that it will be readily available to the processing unit.

The cache units or cache memory units are generally much smaller in addressability than the main system external memory, but since processing, most often is sequential or repetitive in nature, the algorithms for cache designs have already been derived for filling cache memory with those data words or instruction words that the processor is most likely to need on its next operation or within the next few operations.

The presently described processing system involves a processor which has, on the same chip, a microcode cache memory for providing frequently used microinstruction words and, additionally has a general cache memory which holds both data words and OPCODE words used to support the operations of the microcode cache. Thus the computer system, by using a general cache memory in conjunction with a microcode cache memory provides speedier data accessibility to the processing unit.

Each time a processor issues a Read or a Write, the cache memory organization checks to find out if it contains the data internally within the cache units. If the cache does contain a requested memory location, it is a cache "hit" and the data requested is then returned on the next clock to the processor.

If the cache memory system does not have the requested data, this is a cache "miss". In this case then the processing unit has to access a system interface in order to get the data from an external memory. However, this extra step results in a great delay which may take 8 or 9 more clock time periods.

The purpose of cache memory systems is to provide needful information to the processing unit on a quick basis. Another main task of the cache is to maintain "data coherency", that is to say, that the data in the cache will accurately match some data residing in main memory. If this is not the case, then the cache memory will need to invalidate any address location in cache memory that had been changed in main memory by a write to main memory.

Cache memories are placed in close proximity to the processor logic to allow for fast data access by the processor unit. Thus, instead of being burdened by a slow data retrieval cycle normally associated with accessing the external main memory, the processor can receive a copy of the data held by a faster cache memory. However, caches are generally much smaller then the main memory so they can only hold a subset of the data found in the external main memory. Thus all of the possible locations of main memory must be mapped into the smaller cache memory to permit maximum utilization of the limited cache size and also in minimizing the time it takes to determine if a required data copy is already present in the cache.

One technique used to achieve this is a four-way, set-associative cache. Such a cache may have its memory divided into four equal parts or sets and a word from external main memory can be mapped into any one of these four sets.

It is also desired to replace the least recently used (LRU) word in cache since it is less likely to be used again in the near future than the other three words that have been accessed more recently. A cache can keep track of the order in which the data has been used by utilizing a LRU RAM which has the same depth as a cache set, and stores a code of bits that can be decoded to the word in a set which has the "most stale" (or least recently used) data at a given address.

In earlier years, the design of the control portion of computer processors have gone through a transition by being converted from hard-wired control units to the more recently types of microcode-driven control units. The microcode is generally referred to as "firmware" and resides at a level below the machine instruction level. The microcode is generally fixed and presented by the manufacturer and is also inaccessible to the user who may not even be aware of its existence.

Microcode instructions must be stored in some type of memory structure which is available to the control hardware of the processor. In many processors, this is a Read Only Memory (ROM) unit which is generally inexpensive and fast, but has the limitation of being fixed and unalterable. Thus when inadequacies are found, or it is desired to change the definition of the instruction set that is implemented, this presents a problem which is very costly to change.

In other types of processors, the microcode instructions are stored in Random Access Memory (RAM). This makes it relatively easy to change the previously fixed type of microcode instructions, but on the other hand, it is much more costly and slower in operation. Additionally, in many VLSI implementations, the Random Access Memory also requires more silicon area per bit, thus reducing the amount of microcode available for use in a given silicon area.

In terms of other practical considerations, both RAM and ROM units are limited in size by certain practical considerations such as power consumption, cost, area required and performance.

With these type of problems presented by RAM and ROM memories, computer systems have been developed with the use of "caching" or cache memory assists in order to provide better service to a processor's need for instruction codes as rapidly as possible.

The present disclosure functions to obtain the benefits of a writable control store without the size constraints of Random Access Memory (RAM) or the lack of unalterability due to Read Only Memory (ROM).

Thus the improved concept that is indicated, is that, instead of attempting to store the entire microcode instruction set in either a RAM unit or a ROM unit, there can be implemented a specialized "microcode cache unit". When a "miss" occurs in an ordinary cache memory unit, the required item is then fetched from the main memory. Most processors are connected to memory systems that are very large compared to the memory space required for microcode storage.

A special problem for microcode cache units is that a cache "miss" is very expensive in terms of average performance. Thus very high "hit" rates are most desirable compared to most general cache applications. It is desirable that hits occur at least 99% of the time in many applications. There are several concepts that make this possible.

(i) First, the amount of microcode actually used in the "normal operation" of a processor is relatively very small. Many OP codes are seldom used, and many esoteric variances of common OP codes are used even less. One obvious example is the action taken under error conditions;

(ii) Second, a microcode post-processor can be used to rearrange the microcode location accessibility to maximize the cache hit rate if the parameters of a caching algorithm and microcode use are known.

Microcode cache operations allow a large, complex, evolving instruction set to be implemented in a single-die package with options as to the whereabouts of the complete microcode in the memory subsystem depending on cost/performance requirements for the system.

Putting the control store off-chip would tend to require deeper pipelining because of the delay incurred. The requirements for computing the address of the next microcode word to be executed would make deeper pipelining of its prefetch very costly. Performance would suffer considerably. Thus the on-chip cache location eliminates much of the pipelining delays incurred if the on-chip caches were not available.

Putting both a general and microcode cache on-chip allows the processor to run for lengthy periods without having to access off-chip. Because of the performance cost of going off-chip (more costly the faster the processor with respect to the memory subsystem), it is desirable to do this as infrequently as possible. Thus, it is useful to implement larger caches as technology allows to further reduce the off-chip traffic.

SUMMARY OF THE INVENTION

The present invention describes a single chip processor associated with availability of a general cache and a microcode cache memory for holding the most frequently used data and instruction words to make them readily accessible to the processing unit in the chip. Both the general cache unit and the microcode cache unit have a data array section and a tag status LRU array section.

The processor chip is thus provided with a specialized microcode cache unit to more rapidly supply requested microcode words to the processor.

Both the general cache and the microcode cache provide a group of "N" Tag Status RAMs to hold address information, validity information and parity information on existing data words or microcode words stored in an associated group of "N" Data RAMs.

The processor's address request for a microcode instruction word is fed to the Tag Status RAMs. If a hit is effected by a group of comparators, then the selected data word or microcode word will be found in the Data RAMs and conveyed to a Control Register in one clock cycle for execution.

If a "miss" occurs for a microcode word request, a state machine controller will request the missing word from a control store in main memory.

A LRU RAM is used to monitor the least recently used set of microcode word addresses so that more recently used words can replace the less recently used words in the Data RAMs.

The processing unit is provided not only with a general cache, but also with a microcode cache unit for keeping the regularly used microcode words available for use in every clock. The presently described implementation involves a 1024 word general cache and a 2K by 90-bit microcode cache. The cache organization is 4-way set associative and each line is one microcode word wide.

If the addressed microcode word is available in the microcode cache unit, then it will be loaded into a Control Register at the end of the clock during which the microcode word was requested. The microcode cache is accessed in parallel to the execution of the microcode word residing in the Control Register.

Should a microcode word be requested that is not available in the microcode cache unit, then all the internal operations of the processor will be "held" on the clock after the miss is detected. This allows the execution of the microcode word in the control register to be completed. Once the "miss" is detected, a request is made to external system memory to fetch the required microcode word assuming that the interface for doing so is available.

Any request of a microcode word to the external system will take several clocks to be returned. There is only a limited amount of useful work that can be done by the particular processor unit between a microcode "miss" occurring and the missing microword being returned. The function that can be done by hardware during this time is to finish any memory command in execution at the time of the microcode miss, or to service any new invalidate requests by the external system. A LRU or least recently used mechanism is used as a replacement system for the microcode cache when all four lines in a "set" of 4 words are valid.

BRIEF DESCRIPTION OF THE DRAWINGS

FIG. 1A is composed of three sheets denoted as FIGS. 1AA, 1AB, 1AC;

FIG. 1B is composed of two sheets denoted as FIGS. 1BA, 1BB;

FIG. 1E is composed of two sheets denoted as FIGS. 1EA, 1EB;

GENERAL OVERVIEW

The environment described herein involves a recently developed processor chip designated as the SCAMP-D which is an acronym for "Single Chip A-Series Mainframe Processor". This chip involves a CMOS die which is operative in a 323 pin package to provide a low cost but high-speed processing function. The SCAMP-D processor will allow efficient running of a specialized instruction set used by the Unisys Corporation and designated as the E-mode instruction set. SCAMP-D uses 90-bit instruction words. A control store is utilized which is programmable and thus is capable of disabling the E-mode instruction set in order to run other types of instruction sets. The E Mode instruction set is a specialized set of instructions used in the Unisys Corporation A-Series computer systems.

The SCAMP-D processor is designed to run at a clock speed of upwards beyond 24 megahertz and the processor requires only one clock signal from the external system. Internal operations of the processor will occur at the speed directly dictated by an external clock. Additionally, the SCAMP-D processor also requires the external system to supply a strobe signal every 512 microseconds.

Figure 1:
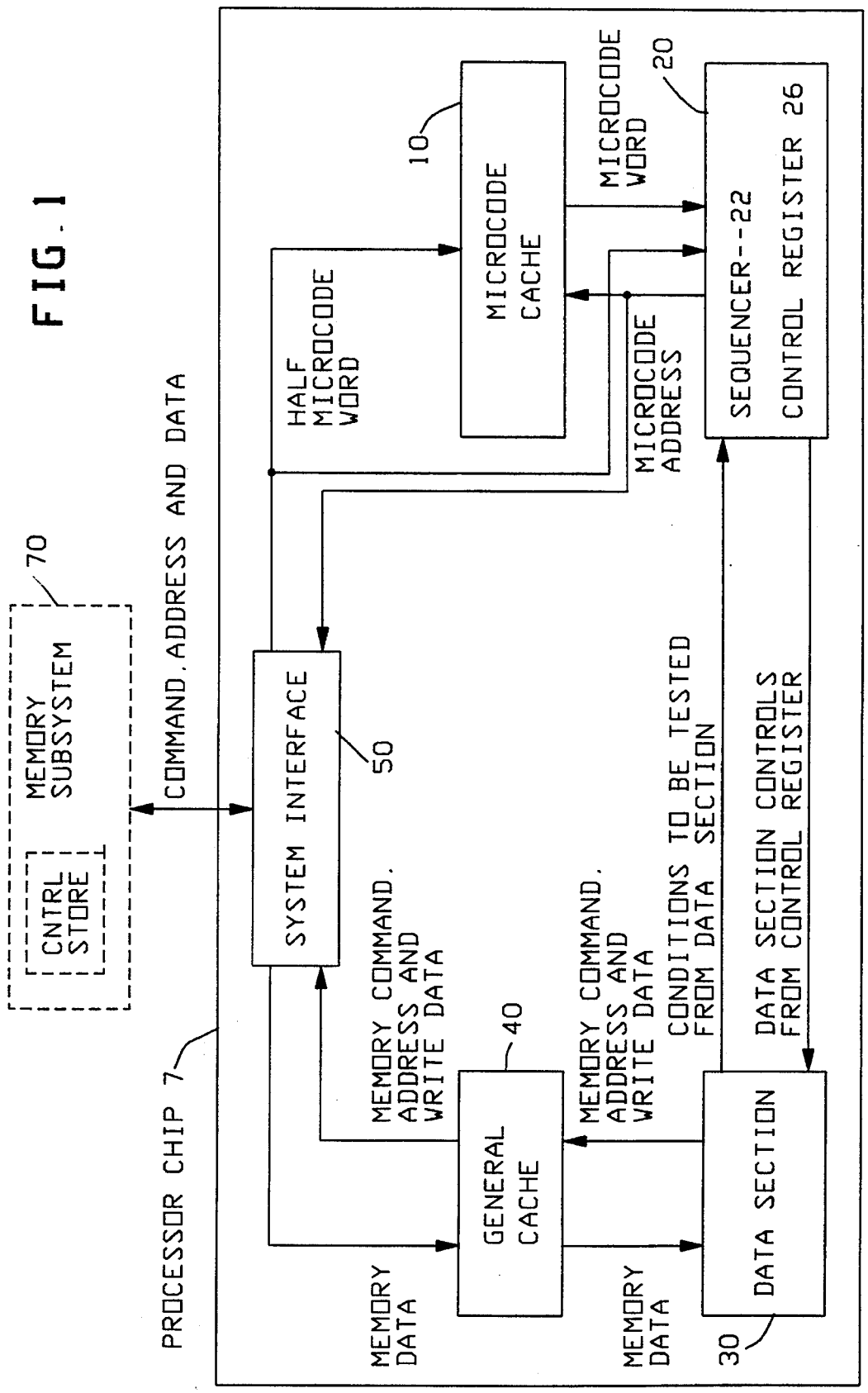
FIG. 1 is a block diagram of a processor chip utilizing a general cache and microcode cache.

Within the SCAMP-D processor, there are five main functional sections which are shown in FIG. 1. These include the data section 30, the control section 20, the microcode cache 10, the general cache 40, and the system interface 50. The system interface 50 connects to the memory subsystem 70 in FIG. 1.

Figure 1A:
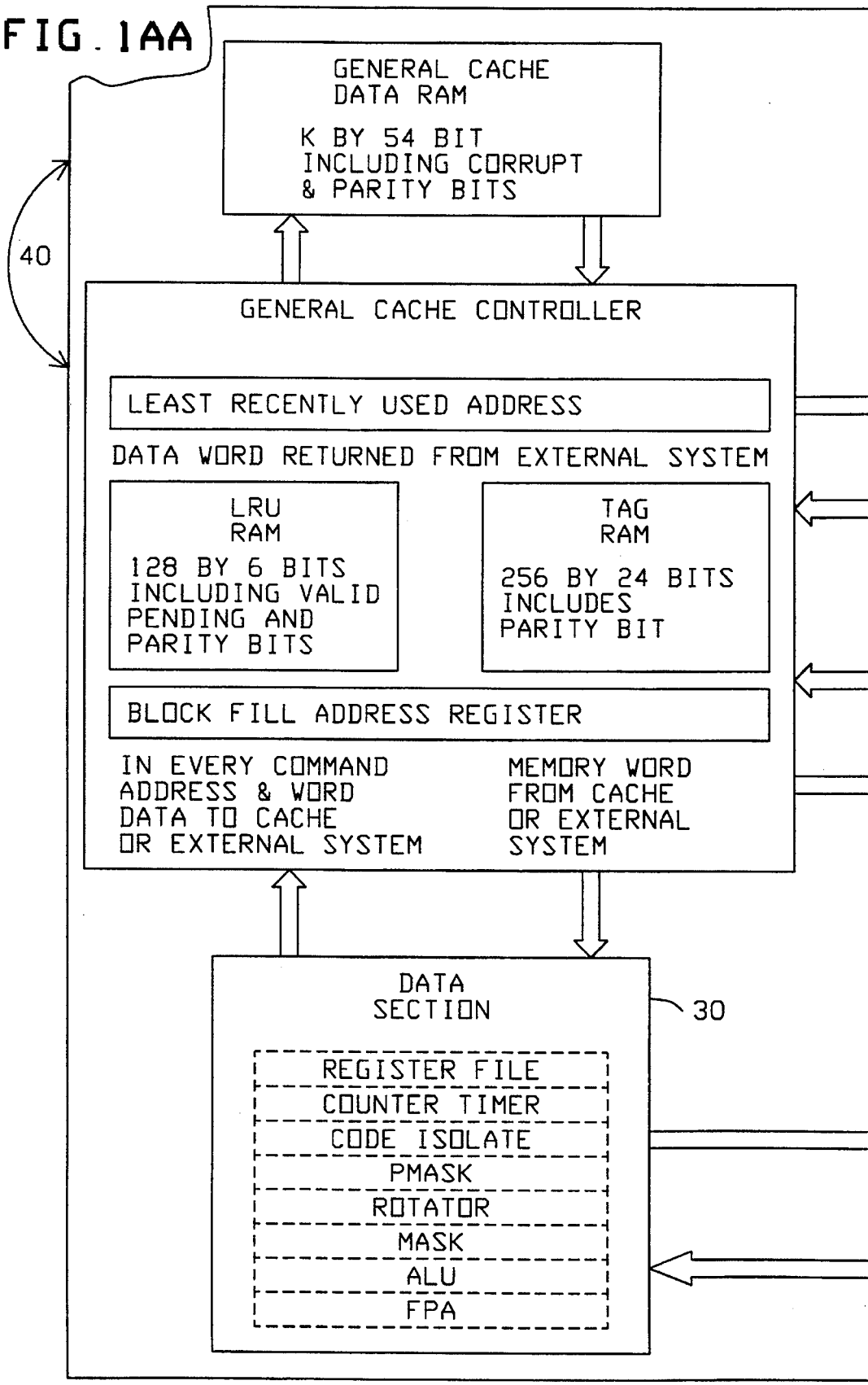
FIG. 1A is a schematic drawing indicating detailed portions of the elements of FIG. 1.
Figure 1A:
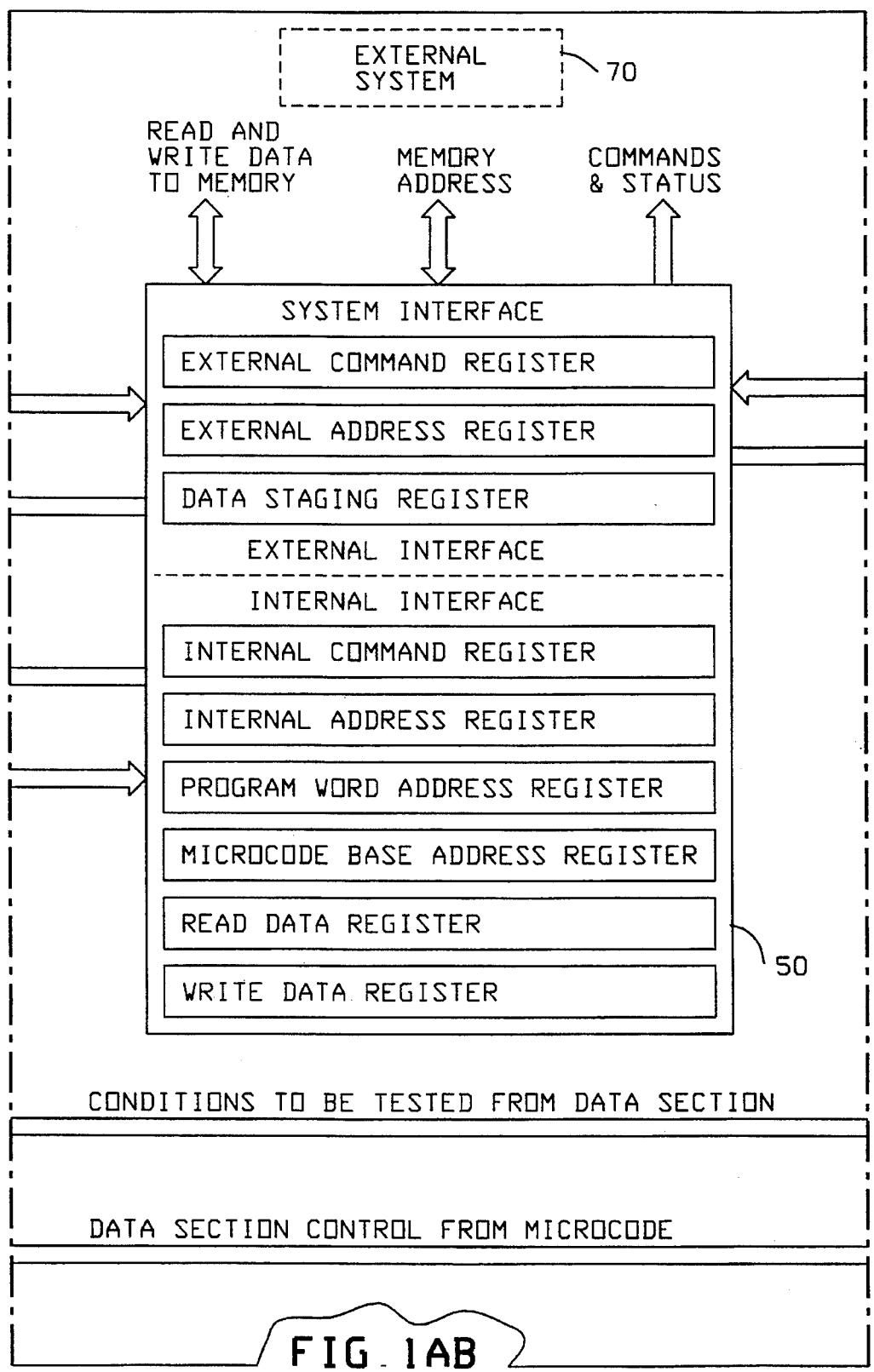
Figure 1A:
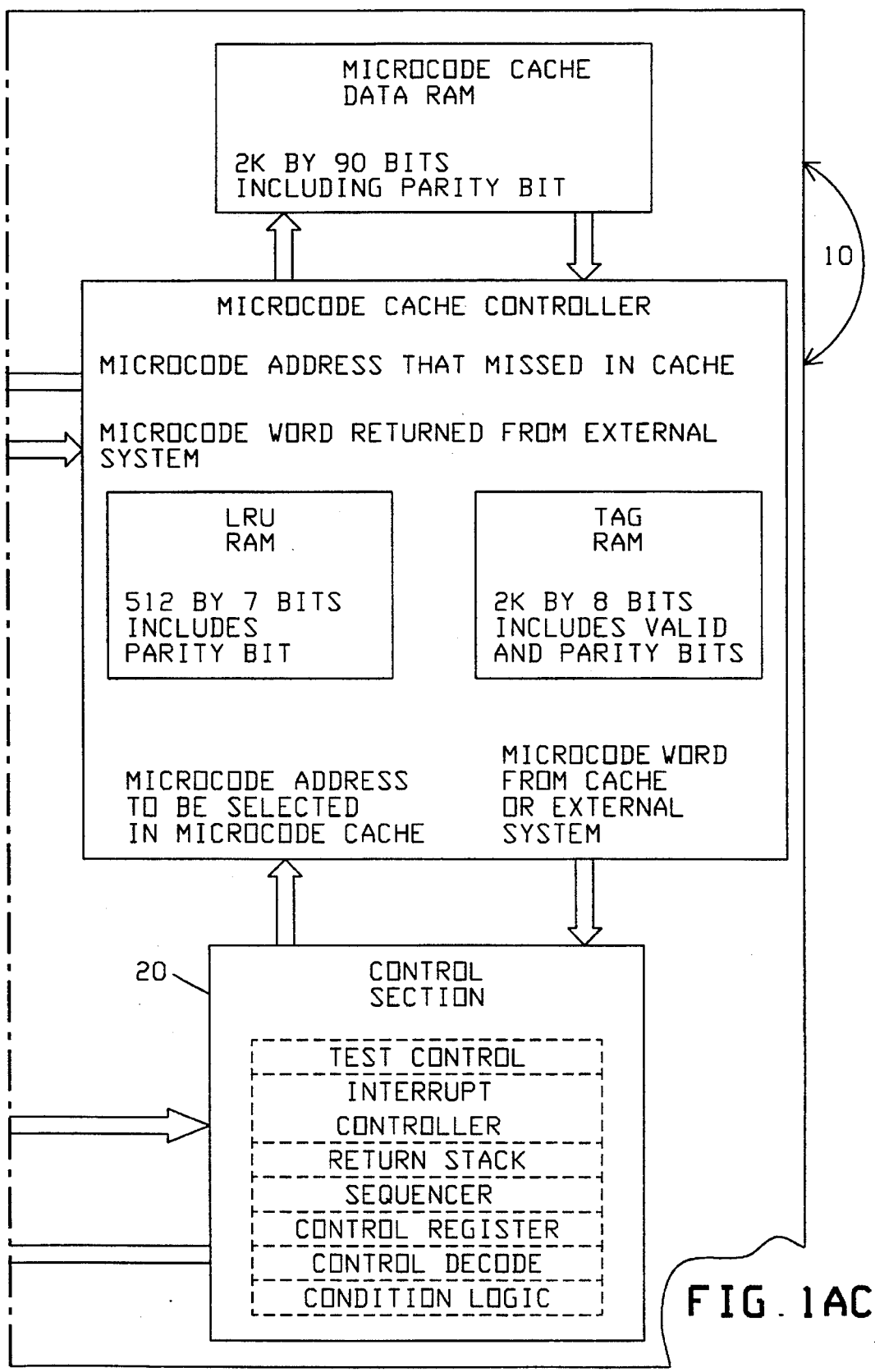

FIG. 1A shows the main modules of the data section 30 and the interconnections. The data section contains the elements of the data path such as the register file, code isolate, counters, timers, rotating/masking hardware, the arithmetic logic unit and floating point assist hardware. The data section is mainly controlled by the microcode.

The register file is used to hold the "state" of the virtual machine that is implemented through the hardware and microcode combination. This includes addresses defining the E-mode stack, top of stack items and intermediate results. There are 14 register file locations defined to hold up to seven double precision top of stack items of the E-mode stack. This feature helps to reduce the number of transfers to and from main memory during operator execution. The maintenance of these registers is done by a combination of hardware and microcode.

The register file permits the independent sourcing of two operands to be processed by the data section 30. One operand may be rotated and both may be masked in order to extract fields. After masking, the manipulated operands are sent to the ALU (arithmetic logic unit) where they may be added, subtracted or logically combined. The result may be stored in the register file for use later, or written into the system interface 50 for use as an address, or as data in a memory operation.

Although the arithmetic logic unit, ALU, only directly supports simple operations like add, subtract, and divide by three, other functions may be performed using multiple passes through the ALU under microcode control or by using a floating point assist hardware.

The counter/timer block in the data section 30 provides support to the microcode for controlling the number of passes or time of operations. The outputs of the counters and timers are used as inputs to the PMASK allowing them to be selected, tested, and manipulated by microcode.

The floating point assist (FPA) provides hardware support to the microcode for the E-mode floating point arithmetic operations and integer multiplication. Floating point numeric values in the E-mode system are represented using binary signs/magnitude notation. The hardware support includes a 39-bit multiplier and alignment logic for manipulation of the mantissas and the exponents used to represent floating point numbers.

Other sources which are fed into the data section 30 involve: a parameter from the code stream, the code pointer value on the program syllable index value from the code isolate, a literal for microcode operand tags, the read data register or the program word address (PWA) within the system interface 50, or the result data being returned from the floating point assist section (FPA) in the data section 30.

In the data section 30, the Code Isolate contains a two word code buffer where each word is 48 bits. The code buffer contains the OPCODES and the parameters to be executed by the SCAMP-D processor. The Code Isolate is responsible for stepping through the code stream extracting the next OPCODE syllable to be executed and the parameters to be read into the data path. The stepping through the code stream is controlled by a combination of microcode and hardware. The Code Isolate uses the OPCODE which is extracted to generate the operator entry address of the microcode routine responsible for the execution of that operator. It also performs a pre-fetch of the next code word when it has finished using the OPCODES/parameters in one of its code buffers.

The Code Isolate extracts OPCODES and parameters that are contained within 48-bit code words received from memory. The OPCODES are used to generate Operator Entry addresses into the microcode. Parameters are directed to the P mask for use in the main Data Path. The Code Isolate will indicate to the system interface when new code words are required. The microcode controls the Code Isolate using the Code Isolate control field.

The Code Isolate manages a 2-code word "code buffer" made up of a code buffer –0 and a code buffer –1 each of which is 48-bits wide. As code words become available either from the general cache within the SCAMP-D or from external memory to the SCAMP-D, they are alternately loaded into the code buffer –0 and the code buffer –1.

Each code buffer is made up of six, 8-bit syllables. The syllables in the code buffer are numbered 0 (most significant byte) to 5 (least significant byte) in code buffer –0 and 6 (most significant byte) to 11 (least significant byte) in code buffer –1.

The Code Isolate extracts parameter and OPCODE information using a code pointer into the code buffer. The value of the code pointer is stored in a code pointer register. The OPCODE syllables are selected using the new value of the code pointer and parameter syllables are accessed using the current value of code pointer. The current code pointer value is defined to be the value contained in the code pointer register during a clock cycle. The "new" code pointer value is defined to be the value that the code pointer will be on the next clock cycle assuming no abort action occurs.

The new code pointer references which syllable within the code buffer could contain the next operator to be executed. The syllable is loaded into the OPCODE register, OPCODE(7:8) on the next non-aborted clock edge.

The microcode controls the selection of parameters from the code stream onto the Code Isolate operand bus. This bus can be selected through the P mask as operand data under microcode control. The parameter syllables are always selected relative to the current code pointer value.

The value of the code pointer can be incremented, either under explicit microcode control or on an E-Mode boundary by a combination of microcode and hardware.

The Code Isolate generates and registers a potential microcode address from the operator in the code buffer's syllable pointed to by the new code pointer value. This address is the operator entry point for the microcode routine which executes the next operator in the code-stream. The registered microcode address is used by the Sequencer when the SCAMP-D is ready to begin the execution of a new operator.

Once the code word in one of the code buffers has been exhausted, the Code Isolate will step through the next code word in the other code buffer and so on through the code stream. The code buffer is provided with circuitry conditions which insure that a code buffer will never be overwritten with a new code word while that particular code buffer still contains OPCODES or parameters that need to be accessible to the rest of the processor.

Figure 1B:
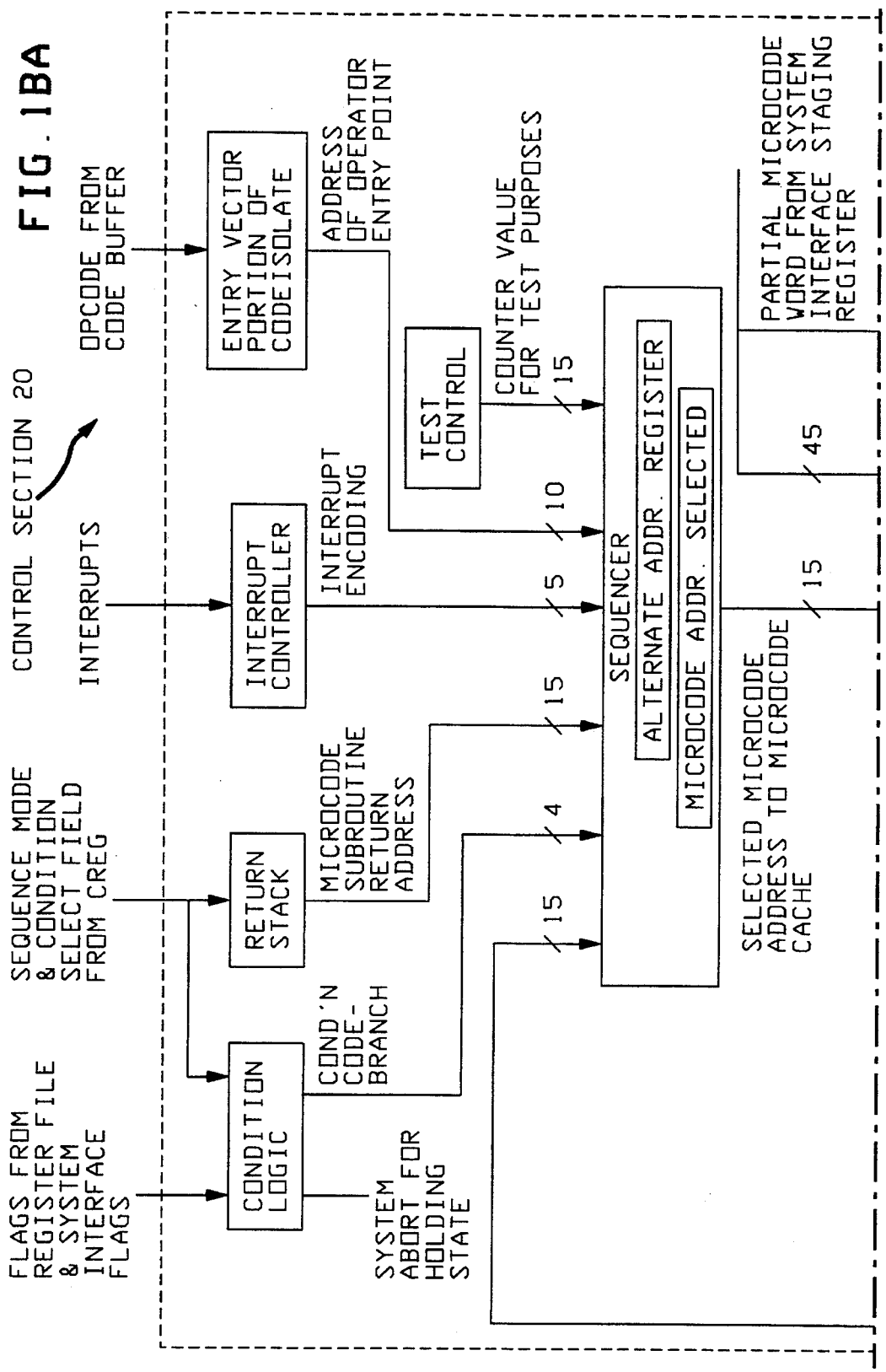
FIG. 1B is a schematic detail of the Control Section of FIG. 1.
Figure 1B:
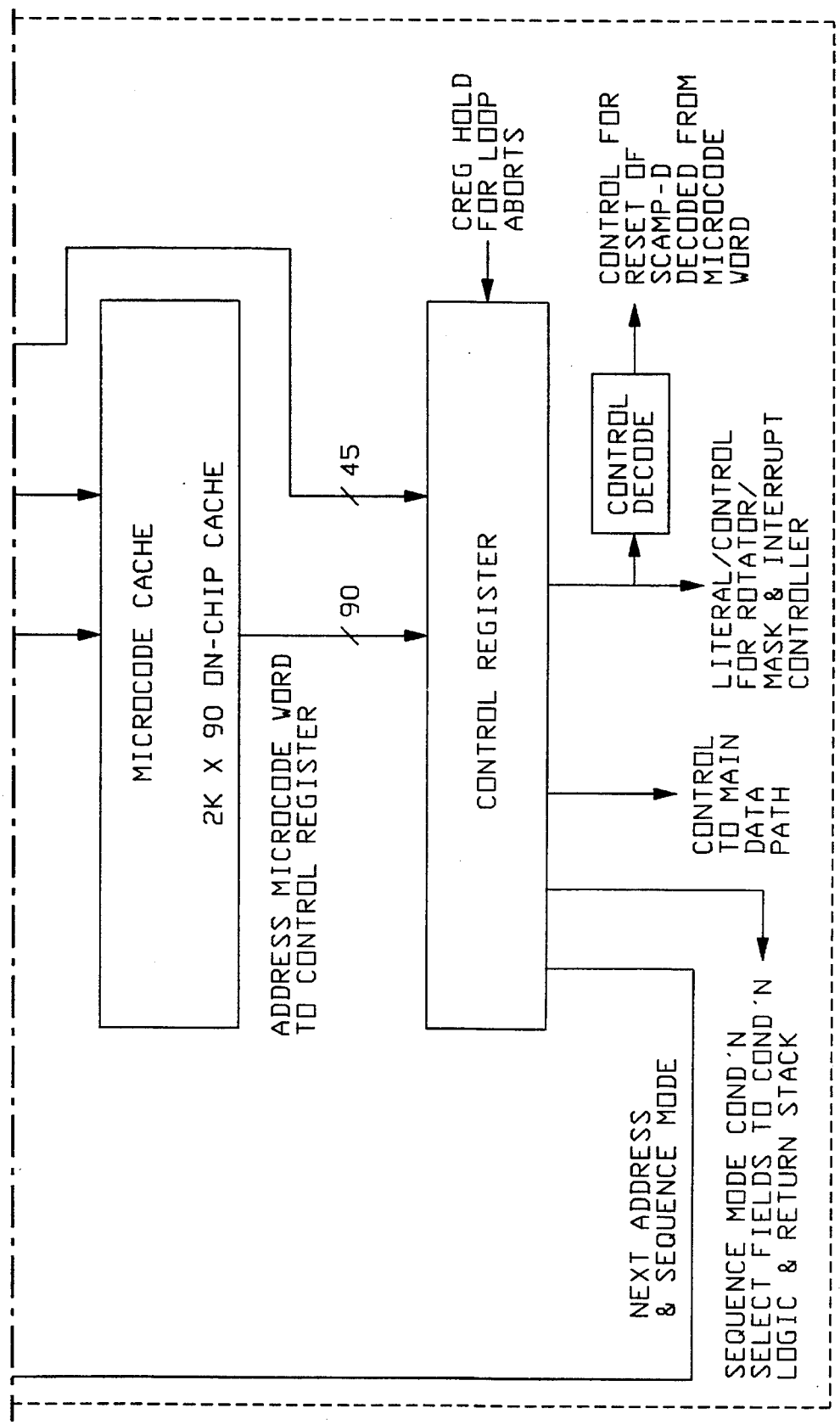
Figure 4:
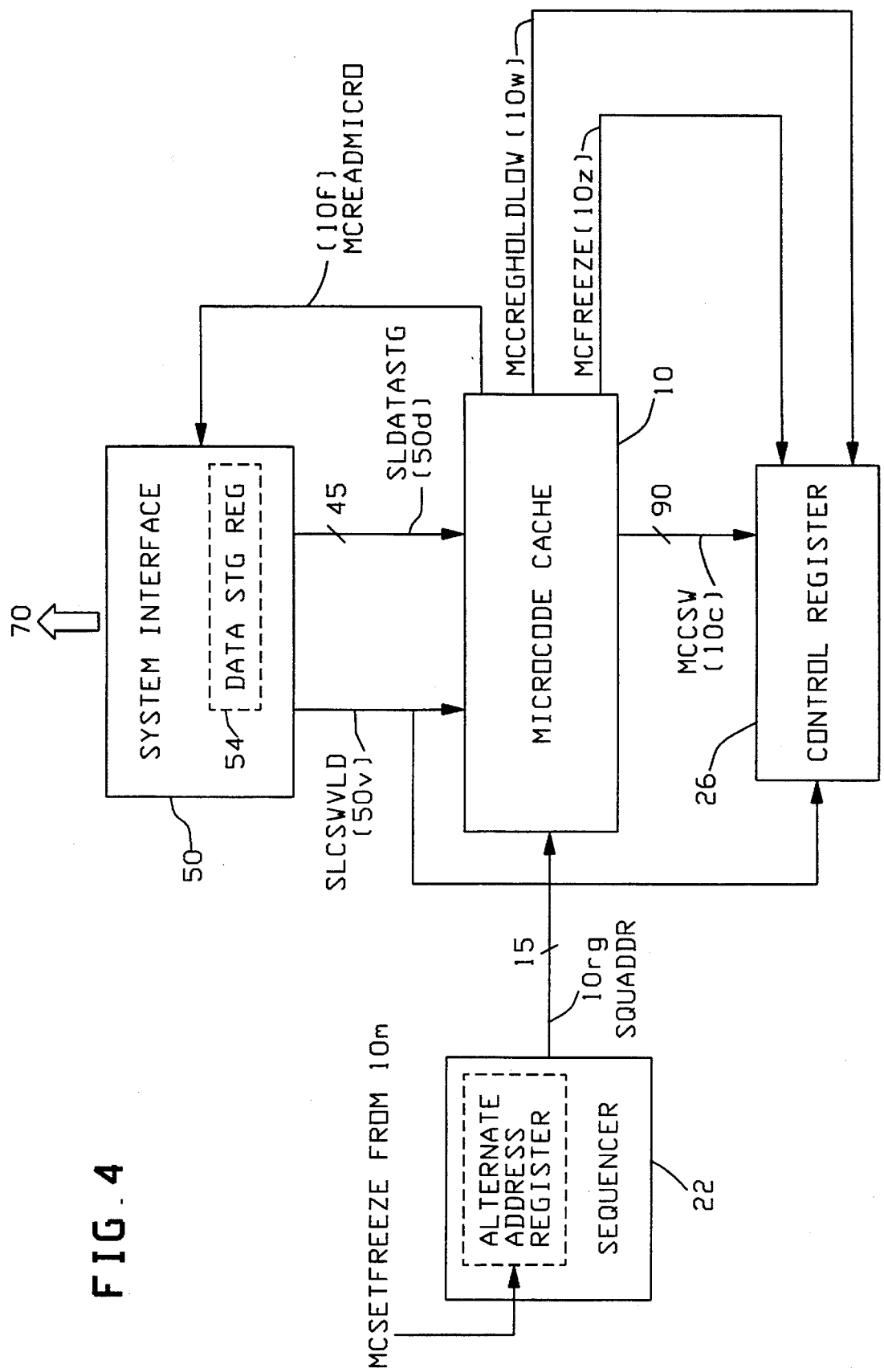
FIG. 4 is a block diagram showing the elements of the microcode cache subsystem.

FIG. 1B is a drawing showing the control section 20 which is responsible for controlling the sequencing of the microcode as well as containing the logic for controlling various portions of the data section 30. The alternate address register is in the Sequencer. FIG. 1B shows the various address sources going into the Sequencer from the Return Stack, Interrupt Controller, Entry Vector portion of Code Isolate and the Control Register. The mcFreeze signal (FIG. 4) from the Microcode Cache causes the alternate address register to be loaded with the missed microcode address, already in the Sequencer. mcSetfreeze is used by the sequencer to select the alternate address register to address the microcode cache on sqUaddr[14:15] (FIG. 4).

The microcode word is 90 bits wide including a single bit for parity checking, and it controls the operations of the SCAMP-D chip processor hardware 7, FIG. 1. The complete microcode is held in the control store of memory subsystem 70. Thus the control store is not within the processor chip 7 itself, but is present off-chip in the memory subsystem.

A microcode word contains 90 bits of control information, divided into fields of differing lengths as shown in Table I:

TABLE I

| Microcode Field | Mnemonic | Bit Width |
|---|---|---|
| Odd Parity | mcParity | 1 |
| Code Isolate control | mcCictrl | 3 |
| PMASK operand1 select | mcPmopnd1sel | 2 |
| PMASK operand2 select | mcPmopnd2sel | 3 |
| Ctrl for dynamic operand1 address | mcDynopnd1sel | 1 |
| Ctrl for dynamic operand2 address | mcDynopnd2sel | 1 |
| Control for dynamic write address | mcDynwrite | 1 |
| Register File tag select | mcTagsel | 1 |
| Register File operand1 address | mcOpnd1addr | 6 |
| Register File operand2 address | mcOpnd2addr | 6 |
| Register File write control | mcWritectrl | 2 |

TABLE I-continued

| Microcode Field | Mnemonic | Bit Width |
|---|---|---|
| Dynamic Rotate/Mask control | mcDynrotnask | 1 |
| Rotate amount | mcRotamt | 6 |
| Mask control/return address MSB | mcMaskctrl | 4 |
| ALU function field | mcAlufcn | 5 |
| Sequence mode control | mcSeqmode | 2 |
| Condition select 1 | mcCondesl1 | 7 |
| Condition select 0 | mcCondesl0 | 7 |
| Next address for sequencing | mcNextaddr | 15 |
| Literal Control field | mcLitctrl | 16 |

Due to performance limitations in accessing an external control store in subsystem 70 at high clock speeds, the processor unit would normally not be able to fetch a microcode word every clock as would be required by the presently described performance goals. In order to handle this situation, the SCAMP-D processor chip 7 keeps the most regularly used microcode words in a 2K word (90 bit) on-chip microcode cache unit 10 which can be accessed in one clock cycle.

The "next" microcode word to be executed is selected by a microcode address generated by the sequencer 22 (FIG. 3) and also shown in FIG. 1B (which is part of the block 20 of FIGS. 1 and 1A). This "next address" may come from one of several sources. Whenever a new E-mode operator is encountered in a code stream, an operator entry address is generated from the OPCODE. The operator entry address is modified to take into account if the NAMC "Name Call operator" proceeded this operator to allow the microcode to be optimized in certain situations.

Further microcode addresses are contained within the microcode word itself, although these may be modified by the internal processor state, thus enabling conditional branching within the microcode. The condition logic, FIG. 1B, is responsible for the testing of various conditions and for controlling the microcode sequencing during conditional branching in the microcode.

A variety of conditions are testable by the hardware, and the microcode contains two fields, CONDITION SELECT 0 and CONDITION SELECT 1 for selecting which combinations of conditions are to be checked. The results of the condition checking are used to select the next microcode word to be executed. The sequencer 22 in block 20 (FIG. 1) is controlled by a microcode field in conjunction with some condition lines. If a condition check should fail, then the sequencer 22 combines the condition codes from the condition logic with the next address field of the currently executing microcode word in order to form the new address. Due to implementation and timing reasons, two clock cycles are lost whenever such an address must be generated, and an ABORT mechanism inhibits unwanted changes of state. One clock is lost while forming the new microcode address and the other clock is lost while fetching the microcode word with the newly formed address.

Microcode subroutines are also used and therefore a microcode address "Return Stack", FIG. 1B, is provided for holding the subroutine return address for a routine when it is called. A field within the microcode, called the "sequence mode", field controls the microcode flow, that is to say, for example, CALL, is a microcode subroutine; RETURN (from a previously called microcode subroutine) uses the address on top of the Return Stack, or else the normal sequencing uses the "next address" field of the microcode, to fetch the next microcode word. A RETURN, when the microcode stack is empty, designates the last clock of an E-Mode operator causing the next microcode word to be addressed based on the next OPCODE in the E-Mode code stream.

Both the CALL and the normal sequencing will use the next address field of the microcode to select the next microcode word. The difference is that the CALL will also push "onto the Return Stack", the address of the microcode word to be executed after the subroutine has completed execution.

A further address is available for interrupt servicing where each interrupt generates a unique address. Three types of interrupts will exist within the SCAMP-D processor and these will involve: (i) Fatal Immediate, (ii) Non-fatal Immediate, and (iii) Inter-operator. Fatal Immediate interrupts will terminate whatever the processor is currently executing. The Non-Fatal Immediate interrupts will suspend whatever the processor is currently executing but will allow execution to continue after the interrupt routine has finished. The Inter-operator interrupts will wait until the completion of the currently executing OPCODE.

Additionally there exists the ability for the microcode to "disable" the taking of external interrupts by masking them individually. Some of the internally generated interrupts can also be disabled by setting the interrupt mask flip-flop.

The microcode word is registered in the Control Register 26 of FIGS. 1 and 1B, and from there it is distributed to the rest of the processor. There are several fields, each of which controls various functions within the processor. Some fields (such as the Literal Control) are used to control several different modules, and further fields are used to determine from which module a particular field is valid. This method reduces microcode width.

A test control/maintenance section, FIG. 1B, of the processor is responsible for all shift chain access, controlling the built-in self test functions and providing adequate debug features for chip debug and system debug.

The general cache unit 40 of FIG. 1 communicates with the data section 30 and the system interface 50. Due to the relatively high clock speed of the processor chip unit, 7, the memory access time could become a major performance bottleneck in the normal situation. However, to minimize the impact of the relatively slow external memory subsystem 70, the SCAMP-D processor 7 has a 1K word cache called the general cache 40. This involves an on-chip unified Code cache and Data cache.

Figure 1C:
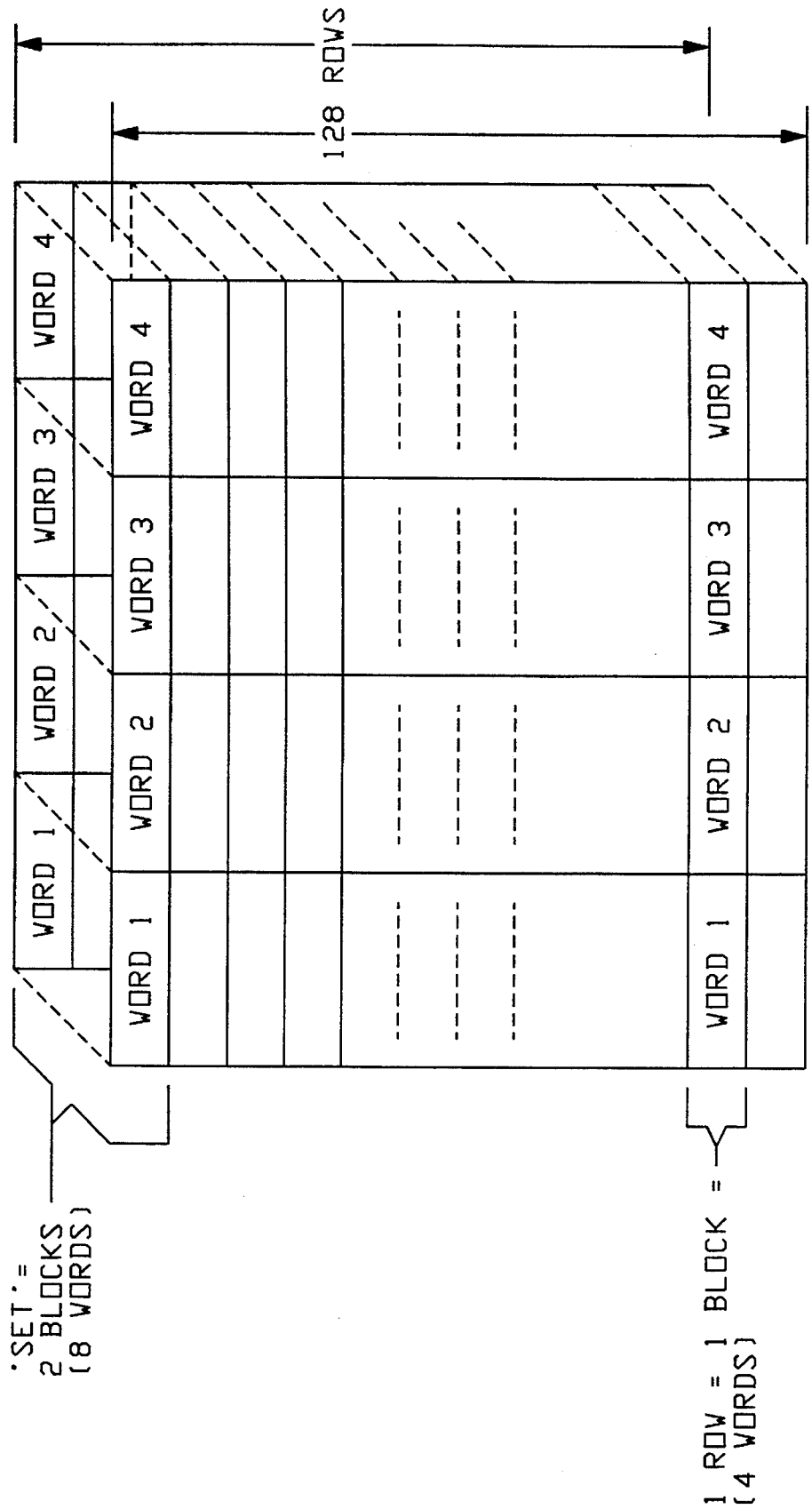
FIG. 1C is a drawing illustrating the arrangement of the General Cache.
Figure 1A:
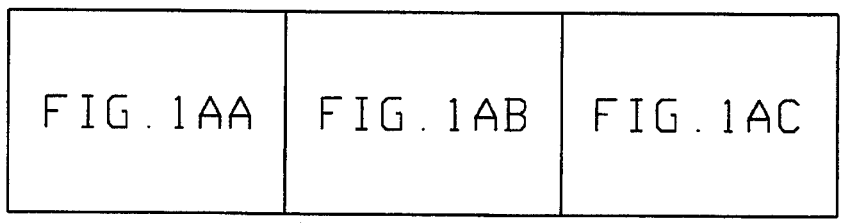
Figure 1B:
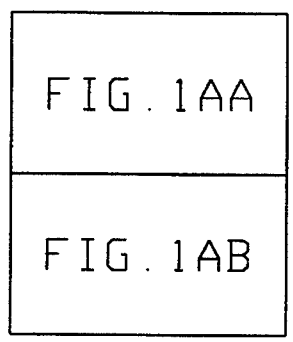

As seen in FIG. 1C, the general cache 40 is organized as a 2-way set associative unit with each line holding a 4-word block (208 bits). The 1K of general cache memory is logically organized as 128 "sets" with each set containing two four-word blocks.

The "Write Operation Function" for the on-chip general cache 40 is a Write-Through system. All Writes will cause an external memory Write cycle and if the memory address for the Write engenders a match (hit) in the general cache 40, then the data is also written to the general cache 40. A Write to a memory address not contained in the general cache 40 will only be written to the external memory 70.

When a block of microcode words needs to be placed in the general cache 40 due to a Read "miss", then the hardware checks to see if there is a non-valid block in the set that can be replaced. If both blocks in the appropriate set are valid, a least recently used (LRU) mechanism is used to determine which block (four words in a row) should be replaced.

The SCAMP-D processor's general cache 40 has a mechanism for invalidating blocks to keep its contents consistent with the external memory 70. The address to be invalidated is passed into the SCAMP-D processor from the external system on a bi-directional bus designated rcAddress [31:32]. Additionally, the operation of the general cache 40 can also be "disabled" at chip initialization time.

Figure 1D:
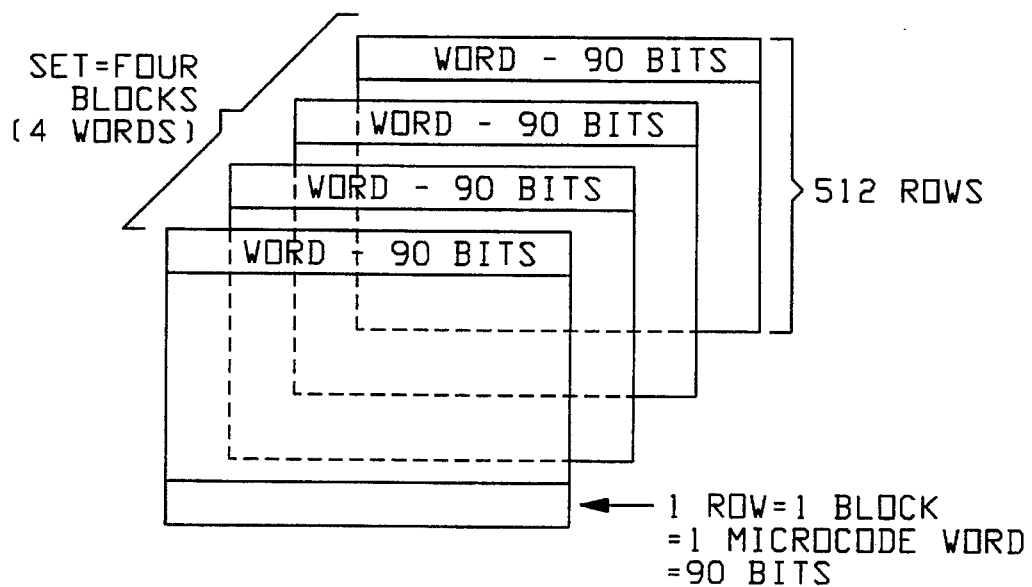
FIG. 1D is a drawing illustrating the configuration of the Microcode Cache.
Figure 1E:
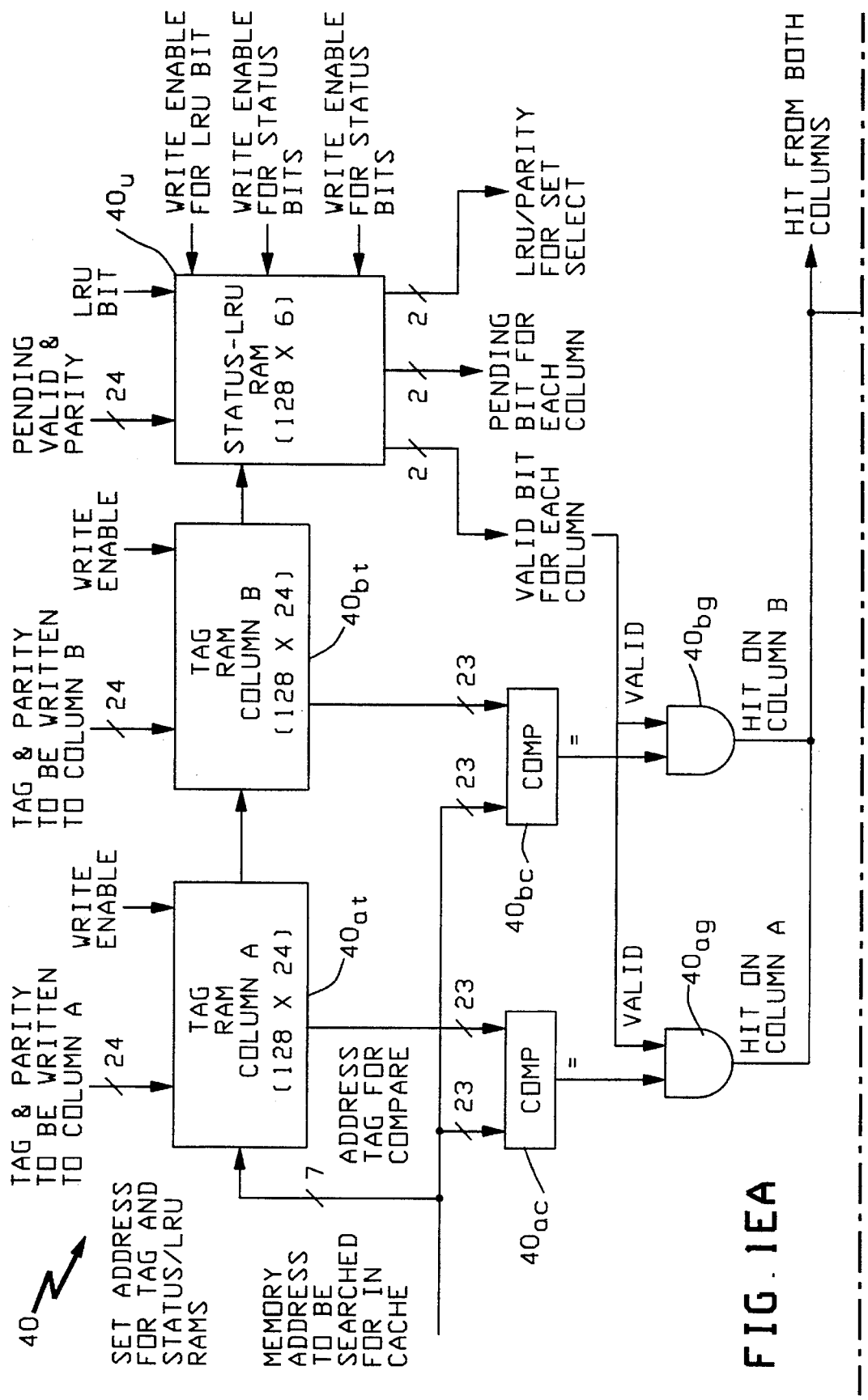
FIG. 1E is a more detailed drawing of the General Cache of FIG. 1C.

The general cache memory of FIGS. 1 and 1C is shown in a more detailed block diagram in FIG. 1E. The general cache memory 40 is internal to the chip of the SCAMP-D processor and is the top level of the memory hierarchy. The general cache can either carry data or code information and is used to hold 48-bit data and code words, a 4-bit tag, a corrupt bit and a parity bit. Communication to and from the general cache 40 is done by means of the system interface 50 (FIG. 1).

The general cache size is 1,024 words and is organized as a two-way set associative, four-word line as illustrated in FIG. 1C. The general cache write policy is as a "store-through" operation and the cache update operation is operative for the LRU or least recently used data to be replaced.

As seen in FIG. 1C, the general cache constitutes an array of 128 rows. A row is a block of four-words while a set is made up of two blocks which consist of eight words.

As seen in FIG. 1E, the general cache consists of a data array $40_{ad}$ and $40_{bd}$ and also a tag-status-LRU array designated respectively as $40_{at}$, $40_{bt}$, and $40_u$. Each of these arrays is divided up into 128 rows and the combination of a row on two blocks constitutes 128 "sets".

Thus each set in the data array $40_{ad}$, $40_{bd}$, consists of two, four-word blocks (FIG. 1C). Each block is addressed by a common line address (2-bits) which will select one 52-bit word from each block of the addressed set. Each block in the data array has an associated tag-status entry in the tag-status LRU RAM array $40_u$. The system interface 50 is responsible for sourcing the data array with the correct set-address (7-bits), the line address (2-bits) and the data input.

When the data array $40_{ad}$ and $40_{bd}$, (FIG. 1E) is being read, the column to be selected (column A or column B) is determined by the two "hit" signals being generated by the tag-status-LRU array $40_u$. When writing to the data array $40_{ad}$, $40_{bd}$, the column to be written to, is determined by a system interface column select signal, (siWritecolsel). There is one write-enable line for the data array $40_{ad}$, $40_{bd}$, which is controlled by the system interface 50.

Each set in the tag-status-LRU array, $40_u$, consists of one LRU bit and two tag-status entries. The LRU bit indicates which of the two blocks of data/code in the data array set is the "least recently accessed". The status associated with each 23-bit tag entry consists of a valid bit and a pending bit. An odd parity bit is stored with each tag-status entry and used for checking whenever a particular entry is read. A hit signal is produced for each of the two logical columns of the tag status array via comparators $40_{ac}$, $40_{bc}$, and gates $40_{ag}$, $40_{bg}$.

The system interface 50 (FIG. 1) operates to source the tag-status-LRU array $40_{at}$, $40_{bt}$, $40_u$, with the correct "set-address" (7-bits), the address-tag (23 bits), the valid bit, the pending bit, the LRU bit and the parity bit. There is a "write-enable" associated with each tag-status and each LRU column. All five write-enables are controlled by the system interface 50. The tag-status-LRU RAM $40_u$ can be "flushed" in one clock cycle and is controlled by an external flush signal (biFlushb).

The data array $40_{ad}$, $40_{bd}$, and the tag-status-LRU arrays ($40_{at}$, $40_{bt}$, and $40_u$) of the general cache 40 are addressed by two independent set-addresses. This allows block invalidates and block fill cycles, other than last word of block fill, to occur during the same clock period.

Each address-tag in the tag-status-LRU array and each word (including corrupt bit in the data array) will contain one-bit of odd parity. The system interface 50 will generate the appropriate input parity bits for the general cache 40 arrays. The parity bit will be written to the arrays when the associated address-tag is written to.

The design of the general cache 40 is arranged according to the constraints of the die area and the need to get the highest percentage possible of cache hits versus the storage module memory accesses, given a fixed cache size. To satisfy these requirements the design mechanisms are used for enabling: store-through cache and four-word line (block transfers) from storage modules to cache.

The store-through mechanism requires that the "write data" is written to both the block in the cache (if it is present), and to the block at a lower level in the memory hierarchy. If the block is not present in the general cache 40, then only the lower level of the memory hierarchy is updated.

The general cache data array $40_{ad}$, $40_{bd}$, is logically organized into two, one-word wide, data RAMs. Each data RAM is 54-bits wide:—48 data bits, 4-bits of E-Mode tag, one corrupt bit and one odd parity bit. Each data RAM is 512 words deep giving a total cache data storage of 1024 words (E-Mode). In any one clock, the data RAM can only be either read from or be written to.

When the data RAM $40_{ad}$, $40_{bd}$, is read, then one word per logical column is addressed. The proper column will be selected by the tag hit logic. A single parity bit is associated with every word in the data RAM $40_{ad}$, $40_{bd}$. Odd parity will be generated on the 52-bit word and the corrupt bit of the word accessed. This newly generated parity bit (of the parity bit stored when the data was written) is compared (in the following clock) to ensure the integrity of all data accessed from the cache.

The general cache tag RAM array $40_{at}$, $40_{bt}$, FIG. 1E, is logically arranged in two columns A and B, each column being 24-bits wide and 128 locations deep FIG. 1C. Each column entry contains an address-tag (23-bits) and an odd parity bit. A write-enable line is associated with each logical column as indicated in FIG. 1E. Further in FIG. 1E, there is a comparator $40_{ac}$ and $40_{bc}$ associated with each logical column which compares the contents of the address-tag of the addressed set with the addressed-tag input from the system interface 50. If there is a "match" and the valid bit for the accessed block is set, then the "hit signal" for that column is set. The valid bit for each block is stored in the Status-LRU RAMs $40_u$. The hit signals from both tag columns are used to select which one of the data columns at $40_{ad}$ or $40_{bd}$ will be output.

Parity bits associated with each of the two logical columns of the tag array ($40_{at}$, $40_{dt}$) are generated and stored during any update of the address tag RAM. Odd parity will be generated on the address tag access from each column. The newly generated parity bit and the parity bit stored where the address tag was written, or compared to ensure the integrity of all address tags accessed from the cache.

The status-LRU RAM $40_u$ is logically arranged in two, 2-bit columns and one, 1-bit column. Each column is 128 locations deep. A write-enable line is associated with each logical column.

Each 2-bit column entry contains a valid bit and a pending bit which are associated with an address-tag in the tag RAMs ($40_{at}$, $40_{bt}$) and a block in the data RAMs ($40_{ad}$, $40_{bd}$). A valid bit when set, says it is permissible to use the data within the associated block of the cache. If the valid bit is not set, then all data in the associated block of the cache would not be used. Any access to that block will then be treated as a "miss".

The "pending" bit, when set, says that data within the associated block of the cache is in the process of being "updated". Since the pending bit is associated with a block in the cache, then the word actually requested may or may not have been updated. The system interface 50 will keep track of which locations within the block have been updated and allow accesses to such locations.

The LRU bit provides a method for replacing the oldest data in the cache and retaining the most recently used data. The LRU bit is set when column A is older than column B for the associated set. When the flush line shown in FIG. 1E is active, all of the valid bits of the status-LRU RAM $40_u$ are reset to "0". When the system is initialized following a power-up, all 128 locations of the LRU column are initialized to "0". This indicates that column B is the "Least Recently Used" for each of the 128 sets. On any given clock, the general cache 40 is searched for read data/code, and the LRU will be updated to reflect that the column which was not accessed for that set is the "Least Recently Used".

The LRU $40_u$ will always produce an output, but it will only be used if a "miss" condition occurs. Upon misses, the LRU bit informs the hardware that the Least Recently Used column will be replaced with the incoming block.

A single odd parity bit associated with the three logical columns of the Status-LRU RAM $40_u$ is generated and stored during any update of the Status-LRU bits. Odd parity will be generated on the combined valid and pending bits of both columns as well as the LRU bit for the set. This newly generated bit and the parity bit stored when the Status LRU was written, are compared to ensure the integrity of all Status-LRU information accessed from the general cache.

In FIG. 1, the system interface 50 is shown communicating to an external memory subsystem 70 and then (within the processor chip 7) has communication lines to the general cache 40 and to the microcode cache 10 in addition to the sequencer 22 and control register 26, in block 20.

The system interface 50 of FIG. 1, controls all communication between the internal SCAMP-D processor 7 and the external system 70. The system interface 50 also controls all communication from both the processor chip and the external system to the general cache 40.

The SCAMP-D processor chip 7 interfaces to the external system 70 via a 32-bit bi-directional memory address bus, rcAddress[31:32], a 52-bit bi-directional data bus, rcData [51:52], a 4-bit memory command bus, rcMemcmd[3:4], and a 6-bit bus interface unit command bus, rcBiucmd[5:6].

Each bus involved here has a unique set of handshake signals associated with it. These consist of an output signal for notifying the external system 70 of "valid" information on the bus, and also an input signal to acknowledge that the external system 70 has finished its use with the information on the bus.

The system interface 50 receives all hardware generated memory commands: Microcode Cache Miss, Fetch Code request, and all of the microcode generated memory commands. The system interface 50 prioritizes and controls the servicing of these requests either from the general cache 40 or the external system 70.

DESCRIPTION OF PREFERRED EMBODIMENT

Referring to FIG. 1, the overall processor unit on a processor chip system 7 is shown wherein a general cache unit 40 and a microcode cache unit 10 cooperate with the system interface circuitry 50 for communicating to and from an external memory subsystem 70 and also communicating with a data section 30 and a sequencer-control register section 20.

Figure 2:
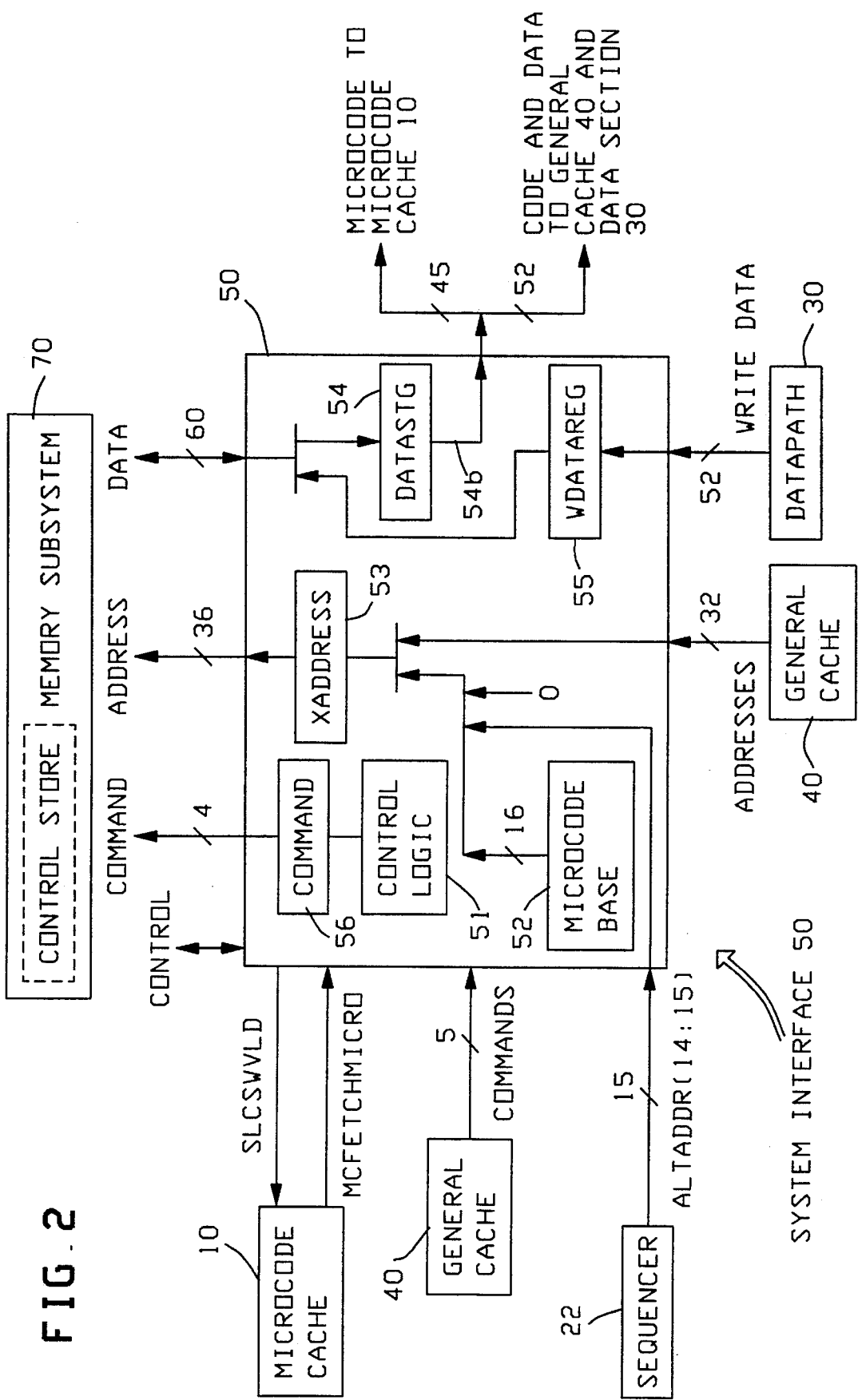
FIG. 2 is a diagram showing the system interface unit.

FIG. 2 is a diagram illustrating the system interface 50 which is the portion of the processor unit which communicates with the memory subsystem 70. The available memory commands are Read, Write, and the Atomic (simultaneous) Read-Modify-Write. The latter two commands will apply to one 52-bit memory word. The Read Command can be requested for 1, 2, or 4 words. The microcode cache unit 10 is the sole requestor of 2 words.

A command can come from either of two sources: the general cache 40 and/or the microcode cache 10. The control logic 51 (FIG. 2) arbitrates and issues the commands to the command register 56 and enables a memory address to the XADDRESS register 53.

The microcode cache 10 signals its request by enabling the signal mcFETCHMICRO, seen in FIG. 2.

The microcode address to be fetched is on the bus ALTADDR[14:15] from the sequencer 22 as seen in FIG. 2. The address sent to the XADDRESS register 53 is a concatenation of the microcode base register 52 in [31:16], ALTADDR in [15:15] and zero in [0:1]. The microcode base register 52 is loaded at machine initialization time before the microcode has to execute. The microcode base register 52 denotes the 64K word bank of main system memory where the microcode has been loaded.

The following will indicate an example which shows the return of data on a Read command. When the memory subsystem 70 has a requested word (or the first word in a multiword request), it deposits this word in the Datastg Register 54 (Data Staging Register) along with an acknowledge control signal. On the following clock, the word is forwarded to the requestor. In the case of a multi-word read, the following words can be deposited in the Data Staging Register 54 along with an acknowledge signal in any number of clocks after the previous word. The system interface 50 contains the information of how many words to expect based on the command issued.

If the issued command were a Write in FIG. 2, the Wdatareg register 55 (Write Data Register) is loaded on the same clock as the command to the general cache 40. When available the XADDRESS register is loaded with the Write address and a Write command loaded into the command register 56. Then the memory subsystem 70 will access these at its convenience.

Figure 3:
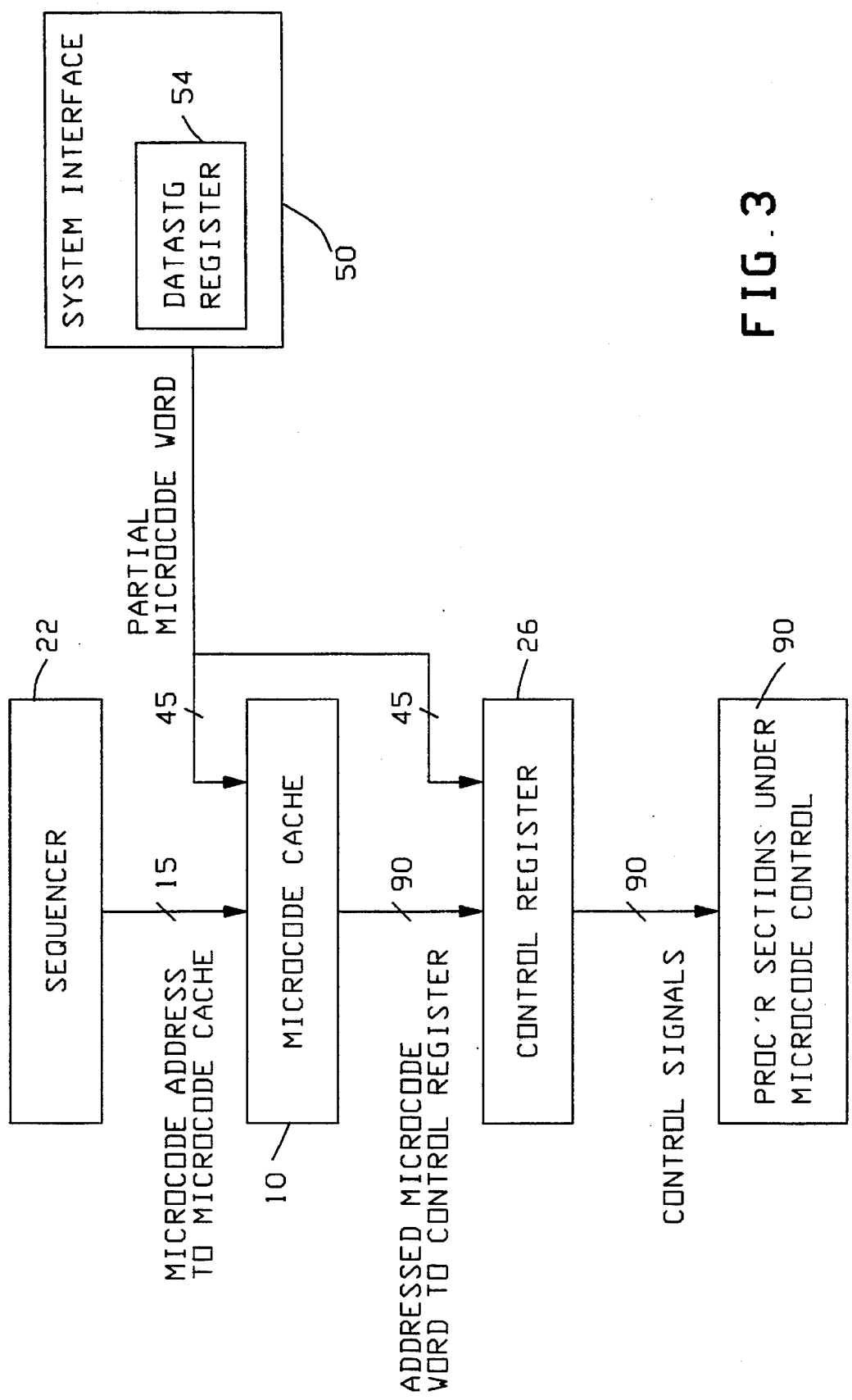
FIG. 3 is a diagram illustrating the operational flow from the sequencer.
Figure 5A:
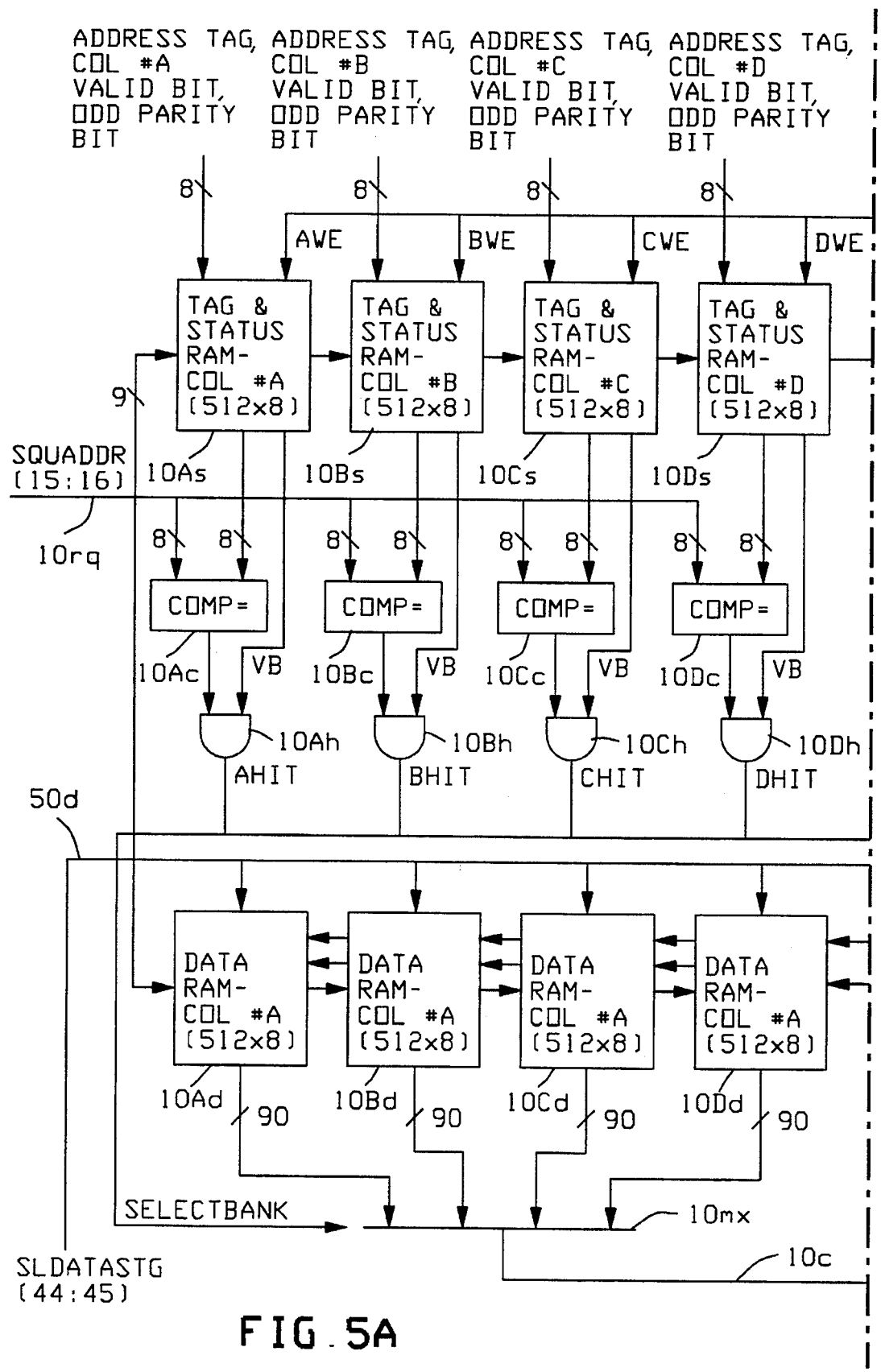
FIG. 5 is a circuit drawing of the elements of the microcode cache unit shown in two sheets denoted as FIGS. 5A, 5B.

Referring to FIG. 3, there is seen a diagram of flow for the control path in the SCAMP-D processor unit. The sequencer 22 supplies a 15-bit micro-address to the microcode cache 10. The microcode cache 10 looks up the address in its Tag RAMs, FIG. 5. These Tag RAMs are seen in FIG. 5 as 10As, 10Bs, 10Cs, and 10Ds. If the address is present, then the microcode cache 10 supplies the corresponding microcode word to the control register 26 of FIG. 3. If the address is absent, the microcode cache 10 signals the system interface 50 to fetch the 90-bit word in two 45-bit halves from the memory subsystem 70 via the Data Staging Register 54. When the word arrives, it is directed to the microcode cache 10 for storage and also to the control register 26.

FIG. 4 shows a diagram of the microcode cache 10 in relationship to various intercommunicating signals from the system interface 50, from the sequencer 22, and to certain output signals provided to the control register 26.

The cache operation function involves a readily accessible cache memory unit holding the most-commonly-used items from a much larger set of accessible items. Thus, this makes access to these commonly-used items much faster for the processor which can then enable a higher throughput.

In order to feasibly implement the faster access to commonly used items, the microcode cache 10 in FIG. 4 is shown in FIG. 1D as organized in 512 rows, having "sets" each containing four microcode words FIG. 1D. The Data RAMs seen in FIG. 5 as $10A_d$, $10B_d$, $10C_d$, $10D_d$, provide the storage for each column of data words.

When a word is required, the row in which it resides can be searched. This row is defined to be the least significant nine bits of the word's 15-bit address.

As seen in FIG. 5, the Tag RAMs $10A_s$, $10B_s$, $10C_s$, and $10D_s$, hold the remaining six bits of the address, plus a parity bit and a valid bit, denoting that the corresponding data location ($10A_d$ ... $10D_d$) contains a microcode word.

If the desired word is found in one of the four columns of the addressed row, there is a "hit" signal and the word requested is supplied from one of the appropriate data RAM locations shown as $10A_d$, $10B_d$, $10C_d$, and $10D_d$ of FIG. 5.

If the required word is not present, this signifies a "miss". In this case, the desired word is fetched from the memory subsystem 70 and put into the row at the location defined as being the least-recently-used according to the LRU RAM $10_u$. The LRU RAM $10_u$ is updated in order to reflect this access.

The microcode cache 10 of FIG. 1 is internal to the processor chip unit 7 (SCAMP-D) and is the top level of the control store hierarchy. An external cache could hold the next level of the hierarchy with memory being the bottom level, or the microcode could be held in an external fast static RAM or held entirely in main memory.

The microcode cache 10 is used to keep the most recently used and generally the most frequently used microwords internally within the processor unit, 7. However, the entire processor microcode is contained external to the processor unit and within the memory subsystem. Communication between the microcode cache 10 and the external system is done via the system interface 50 of FIG. 1 in order to supply the appropriate microcode words to be stored in the microcode cache 10.

In the preferred embodiment, the microcode cache size is 2048 microcode words, FIG. 1D and is organized as a four-way set associative, one-word line, and may be bypassed at chip initialization time.

During normal operation of the processor unit 7, the microcode cache 10 will be addressed by the sequencer 22, FIG. 3 on every clock. The microcode address will request the microcode word to be loaded into the control register 26, FIG. 3, for execution during the next clock cycle assuming that no abort cycle occurs. If the control register (CREG) 26, FIG. 3 is going to be "held" at the end of the current clock, then the microcode address presented to the microcode cache 10 will not result in a microcode "miss" request being signaled to the system interface 50. This will prevent wasting clock periods due to fetching microcode words which will not be loaded into the control register 26. This is true of both of the two types of operation which are designated as "bypass" and "non-bypass" modes of operation, discussed hereinafter.

The sequencer addresses which have a "hit" in the microcode cache 10 will result in the control register 26 being loaded (FIG. 4) with the microcode cache output, mcCsw [89:90], at the end of the clock during which the cache was accessed. In the case of a "miss", the microcode cache controller 10$_m$, FIG. 5, will control the loading of the control register 26 with microcode from the external control store in memory subsystem 70.

Microcode cache "miss" requests are signaled to the system interface 50 by the signal designated mcReadmicro in FIG. 4. The system interface 50 will respond for microcode cache "miss" requests by sending out the absolute microcode address and a read-microcode memory command whenever the external interface is available.

Since microcode words are 90-bits wide and the interface to the main memory subsystem is only 52-bits wide, the control register 26 and the microcode cache 10 are loaded in separate clock periods upon a "miss" condition (freeze cycles). The system interface 50 also acts to inform the microcode cache controller 10$_m$ state machine (FIG. 5) when each half of the requested microcode word is available to be loaded into the control register 26 and the microcode cache unit 10. The signal siCswvld (FIG. 4) notifies the microcode cache 10 when each half of the microcode word is available in the data staging register 54 in the system interface 50.

The microcode cache 10 will hold the appropriate processor state on the clock after a microcode "miss". The microcode cache 10 does this by asserting the mcFreeze (FIGS. 4, 5) signal which holds all abortable states by asserting the processor's system abort and holds all the appropriate non-abortable states directly. The mcFreeze signal is set on the clock after the "miss" and will remain set until the second half of the requested microcode word is placed in the control register 26 from the memory subsystem 70.

The external system 70 will always return the memory word addressed first and then the word at the address incremented by 1. The processor unit (SCAMP-D) will only pass out one address and the host system will increment the address appropriately.

The processing unit requires that the external memory subsystem 70 must guarantee to return the least significant portion of the microcode word (lower 45-bits of the microcode word) first and then return the most significant portion (upper 45-bits of the microcode word). The processing unit will always send out an even address on a microcode miss, thus the least significant portion of the microcode word will be stored at an even address and the most significant portion of the microcode word will be stored at the reset address.

As seen in FIG. 5, the microcode cache 10 is constructed of four main subsections:—the cache controller state machine 10$_m$, the Data RAM group 10A$_d$, 10B$_d$, 10C$_d$, 10D$_d$, the tag-status RAMs, 10A$_s$, 10B$_s$, 10C$_s$, and 10D$_s$, and finally the LRU RAM 10$_u$. The cache controller state machine 10$_m$ controls the interface of the microcode cache 10 to the rest of the processing unit. It also detects and controls microcode "miss" cycles as well as handling the various error conditions associated with the microcode cache 10 operation.

The lower nine bits of the microcode address, sqUaddr [8:9], are used as the "set address" (or row number) in the microcode cache 10. Because each microcode word takes two locations in the memory subsystem, the first word is at an even address (the least significant bit of its address is zero) and the second word is at the subsequent address (bits[31:31] are the same and the least significant bit of its address is one). The remaining portion of the microcode address, sqUaddr[14:6], is used as the "address tag" for tag comparison.

The data RAMs 10A$_d$ . . . 10D$_d$ of the microcode cache 10 are made of four columns of 512 microcode words. A "cache set" is made up of one microcode word from each column where each word has the same "set address". This gives a total of 512 sets of four words each, FIG. 1D.

When the microcode cache 10 is accessed, then each word of a set will be read from the data RAMs 10A$_d$ . . . 10D$_d$, using the set address. The requested word, if present, will be selected from the correct column using the hit signal from the tag RAMs 10A$_s$ . . . 10D$_s$. Within each microcode word is a parity bit which is used for odd parity checking on a microcode hit.

The tag RAMs 10A$_s$ . . . 10D$_s$ of the microcode cache 10 have the same structure as the data RAMs 10A$_d$ . . . 10D$_d$ since each microcode word in the data RAM has a tag RAM location associated with it. Each tag RAM location has a six-bit tag corresponding to the address tag of the microcode word held in the corresponding location of the data RAM. Each tag within the addressed set is compared with the requested address tag field, sqUaddr[14:6] during a microcode cache Read operation and a hit signal will be asserted if the tags are the same.

The tag RAMs 10A$_s$ . . . 10D$_s$ also contains a valid bit and a parity bit in each tag location. The valid bit signifies that the microcode word in the corresponding data RAM location is valid. No "hit" will be active for this column if the valid bit selected by the set-address is zero. A parity bit is also stored in each location of the tag RAMs thus allowing an overall odd parity check to be done whenever that tag location is Read.

The LRU RAM 10$_u$ (FIG. 5) contains information regarding the relative usage of each word within a set of words in the microcode cache 10. The LRU hardware provides a method for keeping the most recently used microcode words in the cache 10. The LRU value always identifies which word within the particular set will be updated as a result of a microcode "miss". The LRU value always reflects all of the invalid words within a set as being the least recently used.

The LRU RAM 10$_u$ is updated with a value reflecting the relative usage of microcode within a set of the microcode cache 10. The LRU RAM 10$_u$ is updated on every hit cycle to reflect the latest usage of microcode within the set during cycles resulting in a hit, and the LRU RAM 10$_u$ is "Read from" and "Written to" (Read-Modify-Write) in one clock cycle.

Whenever there is a microcode "miss", the LRU RAM 10$_u$ will inform the control logic of LRU Logic Unit 10$_g$ FIG. 5, which of the four microcode RAM columns is the least recently used column for the addressed set. Thus this column will be updated with the incoming microcode word. For this reason, the control logic of 10$_g$ will supply two address bits to the State Machine 10$_m$ which, in conjunction with the set address, will determine which microcode data RAM location will be written-to.

The LRU RAM 10$_u$ is 512 words deep by 7-bits wide. Each word of the LRU 10$_u$ contains a 6-bit value reflecting the relative usage of the four associated entries in the microcode Tag-Status RAM plus an odd parity bit associated with the LRU value. The LRU RAM 10$_u$ is addressed by the "set address" from sqUaddr[8:9] line 10$_{rq}$ in FIG. 5.

MODES OF OPERATION: The microcode cache 10 may be configured to be either in a "bypass mode" or in a "non-bypass mode" by a flip-flop designated as the MCENABLE flip-flop which is reset at chip initialization time. The microcode cache controller state machine 10$_m$ of FIG. 5 operates to load the control register 26 with the next microcode word to be executed by the processor unit. The microcode cache 10 is accessed in parallel to enable microcode execution on the control register output. The control register 26 is sourced by the microcode cache output, McCsw(89:45), McCsw(44:45), FIG. 5, if a valid "hit" occurs. A valid hit may be defined as "the address tag of the sequencer address equals only one of the valid address tags of the addressed set". If there is a "miss" and clCregholdhigh=0, then the mcFreeze signal will be raised on the next clock edge. This will allow the microcode word currently in the control register 26 to be executed and the "missed" microaddress to be loaded into an alternate address register in the sequencer 22.

The microcode cache controller state machine $10_m$ will assert mcSetfreeze whenever a microcode "miss" occurs either due to a word not being available in the cache or a parity error is detected on the word about to be executed from the control register 26. The mcSetfreeze signal is registered in the sequencer 22 and is used to select the alternate address register to address the microcode cache on sqUaddr[14:15]. This allows the microcode cache 10 to be correctly updated when the missing microcode word is returned since the alternate address register will contain the missed microcode address.

The microcode "miss address" is necessary in forming the address sent off-chip for the read-microcode request. For this reason, ALTADDR[14:15] from the sequencer 22 (FIG. 2) is sent to the system interface 50 to be concatenated with a microcode base address register (52, FIG. 2) to form the absolute microcode address to be sent off-chip.

When a microcode miss is detected, then the control register 26 is held until the appropriate half of the microcode word has been fetched from the external system over to the processing unit (SCAMP-D). The microcode cache 10 will control the loading of the separate halves of the control register 26 when the low or the high half of the microcode word is in the data staging register 54 in the system interface 50, FIGS. 2, 3. Once the high half of the microcode word has been returned into the control register 26, then the microcode cache 10 will reset the signal mcCregholdlow and mcFreeze thus to allow the microcode execution to resume.

The mcFreeze signal (FIGS. 4, 5) will be used to select the siDatastg bus $54_b$, FIG. 2 in the system interface 50 or else the microcode cache output as the source of the microcode word for the control register 26. The cache output will be selected when there is no microcode cache freeze cycle occurring, that is to say, mcFreeze is unasserted.

NON-BYPASS MODE: In the non-bypass mode, the microcode cache 10 is presented with a microcode address from the sequencer 22 on every internal processor clock cycle. The "set address" from sqUaddr[8:9] will address the tag portion ($10A_s \ldots 10D_s$) (FIG. 5) of the cache 10 and the address tag will be compared to four tag outputs from the addressed set. If one and only one of the valid tag outputs of the addressed set compare with the address tag, then a hit condition is generated and the appropriate column from the microcode data RAM ($10A_d \ldots 10D_d$) is selected as the source of microcode to be loaded into the control register 26 signal mcCsw[89:90].

The LRU RAM $10_u$ will also be updated on the next clock edge to reflect that at the column which was just accessed is the "most recently used". The LRU RAM $10_u$ output is used to determine which column is least recently used and consequently updated when the requested microcode word returns after a "miss".

If the microcode address presented to the cache 10 results in a "miss" (no match with the valid addressed tags) and the signal clCregholdhigh is not asserted, then the signal mcReadmicro (FIG. 4) will be asserted the clock just after the cache look-up. The mcReadmicro signal will be reset when the read-microcode request is sent to the external system.

The signal mcFreeze (FIGS. 4, 5) on line $10_z$ will be asserted on the clock after the tag comparison fails, since this allows the valid microcode word in the control register 26 to complete execution. The signal mcFreeze will remain asserted until the complete microcode word has been returned from memory into the control register 26. During a microcode freeze cycle, the microcode cache 10 will control (via the state machine controller logic $10_m$) the loading of the control register 26 using the mcCregholdlow (FIGS. 4, 5) signal on line $10_w$. The LRU $10_u$ will be updated at the same time the second half of the microcode word is written to one of the microcode data RAMs $10A_d \ldots 10D_d$.

The signal mcReadmicro (FIG. 4) will be asserted on the same clock as the "miss" is detected. This allows the system interface 50 to send out the absolute microcode address and a Read-microcode command to the external system 70, assuming the external interface is not busy. The assertion of mcReadmicro will enable the microcode base address register 52 in the system interface 50, (FIG. 2) on to bits[31:16] of the absolute memory address and the ALTADDR[14:15] bus into bits[15:15] of the memory address. The least significant bit of the absolute memory address will be zero since the memory address for an external read-microcode memory command will always have an even address.

BYPASS MODE: In the bypass mode, the microcode cache 10 will always produce a "miss" condition for every microcode word executed. The processing unit (SCAMP-D) will only request a microcode word from main memory using mcReadmicro ($10_f$, FIG. 4) if the signal clCregholdhigh is not asserted and there is no outstanding microcode request to the system interface 50. If the signal clCregholdhigh is asserted, then no microcode miss request will be generated.

The system interface 50, continues to use the same priority for microcode miss requests. The procedure for loading the control register 26 as a result of a "miss" is the same as in the non-bypass mode using the signal mcCregholdlow (FIG. 4, line $10_w$) for load control while using mcFreeze on line $10_z$ to hold the appropriate processor state during this time.

In the bypass mode, the mcFreeze signal will only be inactive for one clock after the control register 26 has been completely loaded (unless this clock aborts). If there is no abort, then this will be the clock where the actual microcode execution occurs.

FIG. 5 shows the basic detail of the microcode cache unit 10 for the SCAMP-D processor. A microcode cache controller state machine $10_m$ is seen receiving certain inputs among which is a "hit signal", either A or B or C or D, from each one of the Tag status RAMs $10A_s \ldots 10D_s$. Additionally, the state machine $10_m$ receives an output from the LRU logic $10_g$ in order to determine which row address is the least recently used. The further inputs to the state machine $10_m$ include a parity signal from the control register 26 and parity signals from the Tag RAMs $10A_s$, $10B_s$, $10C_s$, $10D_s$.

In performing its functions, the state machine $10_m$ provides a number of output signals. One of these is the Write Enable signal on line $10_e$ to each of the Tag RAMs and the LRU RAM. Additional outputs from the state machine $10_m$ are presented to the LRU logic unit $10_g$ on line $10_{mg}$ and to the data RAMs $10A_d, \ldots 10D_d$ on the lines 10hi and 10Lo, FIG. 5. Additional outputs from the state machine $10_m$ denote outputs to the control register 26 which are shown in FIG. 5 as inputs to control register Section 26h (High) and Section 26L (Low).

The attached glossary will provide definitions and functions of the signals shown in FIG. 5.

Referring again to FIG. 5, it is seen that the Tag status RAMs $10A_s \ldots 10D_s$ will receive address tags, valid bits and parity bit signals as inputs. Each of the Tag RAMs provide an output to a comparator ($10A_c$, $10B_c$, $10C_c$, and $10D_c$), in addition to providing an output to AND gates $10A_h$, $10B_h$, $10C_h$, and $10D_h$ which provide the "hit" signals to the state machine $10_m$, to the LRU logic $10_g$, and multiplexor $10_{mx}$ (FIG. 5).

The address of the micro word being requested is designated as the signal sqUaddr[15:16] on a line $10_{rq}$ which is presented to each of the comparators $10A_c \ldots 10D_c$.

A bus $50_d$, FIGS. 4, 5 from the data staging register 54, carries the signal siDatastg[44:45] seen in FIG. 5 which is provided to each of the data RAMs $10A_d \ldots 10D_d$. The selected output word of a data RAM is fed in two phases of 45 bits (half word) to the control register 26 shown as signals mcCsw[89:45] and mcCsw[44:45] on a bus $10_c$ containing the selected 90 bit microinstruction word which will control the next clock of processor execution. Multiplexor $20_{mx}$ (FIG. 5) provides two 45 bit halves of the selected word to the control register 26.

Another input signal to the control register 26 is the signal siCswvld on line $50_v$ which is a signal to the microcode cache 10 and its control register 26 from the system interface 70 indicating that a half microcode word is available.

FUNCTIONAL OPERATION: The described SCAMP-D processor 7 makes use of the microcode cache 10 in a efficiently rapid fashion. While the data section 30 (FIGS. 1, 1A) is executing the microcode word in the control register 26, at the same time the sequencer 22 (FIGS. 1, 2, 3, 4) will be supplying to the microcode cache 10, the next address to be executed on the signal line sqUaddr[14:15] as seen in FIG. 4 on bus $10_{rq}$.

The microcode cache 10 detects a "hit" if one of the comparators $10A_c$, $10B_c$, $10C_c$, and $10D_c$, (FIG. 5), reports a "match" (hit) and one of the corresponding gates $10A_h$ - - - $10D_h$ reports a hit because of the match at the same time that the corresponding valid bit on the valid bit lines VB of FIG. 5 are active. In this case, the microcode word is supplied from the corresponding entry in one of the data RAMs $10A_d \ldots 10D_d$, and the word is sent to the control register 26 by the end of the first clock.

The selection is made by the use of the lower nine bits of the signal sqUaddr[15:16] line $10_{rq}$ FIG. 5, which is supplying signals to a row within the RAMs, that is to say, the Tag and status RAMs, the Comparators and Data RAMs. This enables one entry from each of the four Data RAM banks onto the multiplexor $10_{mx}$. The setting of one of the four signals designated AHIT, BHIT, CHIT or DHIT provides control of the multiplexor $10_{nx}$ which selects which of the four entries (microcode words) is be used.

If the microcode cache 10 detects a "miss", that is to say, it does not have the word or there is a parity error or multiple-hit detection error, then the system begins a "miss" processing sequence. At this state the microcode cache state machine $10_m$ asserts the signal mcFreeze to the control register 26 in order to freeze the data section 30 at the end of the clock period. During "miss" cycles, all the necessary processor states are held (frozen) due to the signal mcFreeze being asserted.

Another output from the state machine $10_m$ is also asserted and this is the signal mcSetfreeze. This signal is registered in the sequencer 22 (FIG. 4). Also, this signal is used to register and hold the address of the requested microcode word onto ALTADDR[14:15] in FIG. 2 for use by the system interface 50.

The state machine $10_m$ also asserts the signal mcFetchmicro to the system interface 50. This signal is a signal from the microcode cache 10 to the system interface 50 requesting that a microcode word be fetched from the memory subsystem 70. On seeing the signal mcFetchmicro, the system interface 50 creates the memory address of the required microcode word by concatenating its 16-bit microcode base address register 52, of FIG. 2, in [31:16] with the sqUaddr [14:15] in [15:15] and the zero in [0:1]. This address is then enabled into the XADDRESS register 53, FIG. 2, when this register is available and a Read-Microcode command is enabled into the command register 56 of FIG. 2.

The Read-Microcode command instructs the memory subsystem 70 (FIG. 2), to return two consecutive words from main memory, starting at the "even" address supplied.

When the first word has been returned to the data staging register 54, FIG. 2, the system interface 50 enables the signal siCswvld in FIG. 4 at line $50_v$. This signifies that the first half of the microcode word is present on bus $50_d$ of FIG. 4 showing the signal siDataStg[44:45]. The control logic 51 of FIG. 2 then resets mcFetchmicro. The cache controller state machine $10_m$ provides this signal to the system interface 50 as seen in FIG. 5.

The signal mcCregholdlow in FIG. 5 is inactive (which is an output of the cache controller state machine $10_m$). This causes the lower half of the requested microcode word to be loaded into the lower half of the appropriate location (as determined by sqUaddr[8:9] and the LRU Logic, $10g$, to address one of the Data RAMs $10A_d \ldots 10D_d$ in the microcode cache seen in FIG. 5 at the control register 26L (CREG-LOW).

Additionally, the upper half of the microcode word is loaded into the upper control register $26_h$ (CREGHigh). The signal ncCregholdlow is then set active. When the second word has been returned from memory 70 to the data staging register 54, FIG. 2, the second signal siCswvld on line $50_v$ (FIG. 5) signifies that the second half of the microcode word is present on the line $50_d$ in FIG. 5 holding the signal siDatastg[44:45]. Also, the signal mcCregholdlow is active from the microcode cache controller state machine 10m. This causes the signal siDatastg[44:45] to be loaded into the upper half of the same section in the microcode cache 10 and also into the upper half of the control register $26h$ in FIG. 5. In this clock, the state machine, $10_m$, asserts Lruwe and the appropriate one of the write enable awe . . . dwe, lines $10_e$ (FIG. 5) to cause the LRU RAM $10_u$ to be updated to reflect that this "missed microcode word" is the most recently used word and to cause the tag location in the corresponding bank to be updated with sqUaddr[14:6]. The valid bit and the appropriate parity bit will also be stored. The output from the state machine $10_m$ designated mcCregholdlow is then set as inactive to be ready for the next microcode miss.

On the clock following the second siCswvld strobe, the signals mcFreeze and the signal mcSetfreeze are reset, thus allowing the SCAMP-D processor 7 to continue execution.

GLOSSARY LIST:

1. MICROCODE WORD 90 bits wide. Contains the encoded instructions defining the functions to be performed by the processor in one clock.

2. MICROCODE ADDRESS

The reference to the next microcode word to be executed. This is in the range 0 to 32,767 words.

3. HALF MICROCODE WORD

Microcode words are held in 2 consecutive locations in the Memory Subsystem (70). Each half is fetched on separate clocks.

4. COMMAND (MEMORY)

The function being requested of the General Cache (40) by the Data Section (30) or of the Memory Subsystem (70) by the General Cache 40 or Microcode cache (10). It is typically either a Read or Write operation. A read operation can request 1, 2 or 4 words. The Microcode Cache only issues Read commands and always requests 2 words.

5. WRITE DATA

The data to be written to the Memory Subsystem 70 on a Write command from the Data Path, item 17 of Glossary.

6. MEMORY DATA

Information read from the Memory Subsystem 70 following a Read command.

7. "CONDITIONS" FROM DATA SECTION (30)

Selected Data Section state items which can be tested under microcode control to affect microcode sequencing.

8. siCswvld (FIG. 2)

The signal to the Microcode Cache 10 and the Control Register 26 from the System Interface 50 indicating that a half Microcode word is available.

9. mcFetchmicro

The signal from the Microcode Cache 10 to the System Interface 50 requesting that a microcode word be fetched from the Memory Subsystem.

10. sqUaddr{14:15}

The address of the Microcode word being requested.

11. MEMORY SUBSYSTEM 70 (FIG. 2)

Up to $2^{32}$ words of Random Access Memory. Each word consists of 52 bits of information. Microcode held in the Memory Subsystem 70 only makes use of 45 of the 52 bits.

12. CONTROL LOGIC 51 (FIG. 2)

Finite State Machine control for the System Interface 70.

13. MICROCODE BASE 52 (FIG. 2)

The value used as the most-significant 16 bits of the 32-bit address when the System Interface 50 requests a Microcode word Read of the Memory Subsystem 70. It is concatenated with sqUaddr in the next 15 bits with the least-significant bit being zero.

14. Xaddress 53 (FIG. 2)

A 32-bit register written by the System Interface 50 and read by the Memory Subsystem 70. It contains the address of the associated command.

15. Datastg 54 (FIG. 2): (Data Staging Register)

A 52-bit register written by the Memory Subsystem 70 containing one word of information as the (partial) result of a Read command. It can be read by the General Cache, the Microcode Cache and the Data Section 30.

16. Wdatareg

A 52-bit register written by the Data Section when it issues a Write command to the General Cache. It is read by the General Cache 40 and the Memory Subsystem 70.

17. DATA SECTION 30

The main functional block of the processor, consisting of and E-Mode code/parameter stream parser unit (Code Isolate) including a set of general-purpose registers, rotation and masking logic and an ALU (Arithmetic and Logical Unit).

18. CODE

The instruction stream consisting of E-Mode instructions forming a program which is interpreted by the microcode executing on the processor.

19. siDatastg

The bus from the Datastg register, 54.

20. mcCsw $10_c$ (FIG. 4)

The bus containing the 90-bit microinstruction which will control the next clock of processor execution.

21. mcFreeze $10_z$ (FIGS. 4, 5)

The signal which causes most of the processor to suspend execution. It is also used to control loading of the Control Register 26. This is asserted the clock after microcode cache tag comparison fails. It remains asserted until the complete microcode word has been returned from memory into the Control Register 26.

22. mcCregholdlow

This is set after the first half of the microcode word being fetched from the Memory Subsystem has been loaded into the lower half of the control register 26. It ensures that the 2nd half of the microcode word is loaded into the upper half of the Control Register.

23. MICROCODE CACHE CONTROLLER STATE MACHINE $10_m$ (FIG. 5)

The control logic for the Microcode Cache, implemented as a state machine.

24. TAG+STATUS RAMs (FIG. 5)

The Tag RAMs (Random Access Memories) in this Microcode cache hold the upper 6 bits of the address of the microcode word held in the corresponding Data RAMs. The lower 9 bits of the address are implicit from the address (or row number) in the range 0–511 of the Tag RAM. The Status RAMs contain 2 bits per entry, and denote whether the entry is "in-use" or "not in-use" (valid or invalid) plus an odd parity bit.

25. LRU SRAM (FIG. 5)

"Least-Recently-Used" bits are used to define the ordering of the 4 entries of each row in the microcode cache 10. They define the "oldest" entry which is used when a new slot is needed for an incoming Microcode word from the Memory Subsystem.

26. LRU LOGIC (FIG. 5)

The logic which maintains the LRU SRAM, $10_u$.

27. (A, B, C, D) HIT GATES (FIG. 5)

Boolean signals which indicate whether the requested address matches the address held in the Tag and Status SRAMs. There is one match signal for each of the 4 sets of the cache. In normal operation, at most, one can be active at any one time.

28. DATA RAMs (A, B, C, D) (FIG. 5)

RAMs which hold the Microcode words corresponding to the addresses held in the Tag RAMs. Each word includes an odd parity bit.

29. Creg (FIG. 5)

The Control Register, 26.

30. SELECT BANK (FIG. 5)

A 2-bit value denoting which bank (or set) contains the requested Microcode word. These are outputs (hit lines) of the AND gates $10A_n \ldots 10D_n$.

31. mcCsw{89:45}

The upper half of mcCsw, which is one-half of the 90-bit micro-instruction word.

32. mcCsw{44:45}

The lower half of mcCsw, which is one-half of the 90-bit micro-instruction word.

33. mcSetfreeze (FIG. 5)

A signal set "on" a Microcode miss to tell the Sequencer 22 to send the address of the missing microcode word to the Microcode cache via signal SQUaddr on line $10_{rq}$. This allows the microcode cache to be correctly updated when the microcode word is returned.

34. ALTADDR(14:15) (FIG. 2):

This is the alternate address from sequencer 22 to the memory system 70.

35. SET-ADDRESS:

Defines a "row" in the Tag-Status and Data RAMs. A "set" consists of 4 entries—one from each RAM. The "Set-Address" is obtained from sqAddr[8:9].

Described herein has been an on-chip multiple cache processing system providing rapid data access and faster throughput via a general cache and microcode cache supporting a processor unit. Thus frequently used data words and program instruction microcode words are made readily available to a processor in one clock cycle. The general cache normally holds and provides frequently used data and E Mode OPCODE program instruction words while the microcode cache holds and provides frequently used micro-instruction words.

The microcode cache subsystem provides N(=4) columns of Tag-Status RAMs having addresses which can be searched for a "hit" resulting in the selection of a requested microcode word from a series of N data RAMs. The selected microcode word is provided in one cycle to an associated control register for immediate execution by a processor unit.

A specialized LRU-RAM (Least Recently Used) in the microcode cache subsystem keeps track of address locations in RAM which are not frequently used so as to make these locations available for more frequently used microcode words. A cache controller state machine will enable a "bypass" mode to set a "miss" condition for requesting a microcode word from main memory as long as there are not existing requests to main memory. A "non-bypass" mode is used to search the Tag-Status RAMs for a "hit" to enable access of a microcode word from a selected Data RAM to a Control Register for execution in one clock cycle.

While the preferred embodiment of the invention has been described, it should be understood that other variations may still fall within the scope of the invention as defined in the following claims.

What is claimed is:

1. A single chip multi-cache processing system comprising:
   (a) system interface means for enabling communication between an external main memory sub-system holding a main microcode word control store and general cache means and microcode cache means, said interface means including:
      (a1) a Read data register for data and instructions read out from said main memory sub-system;
      (a2) a Write data register for data and instructions to be written into said main memory sub-system;
      (a3) a microcode base address register for holding the base address of microcode words in said main control store;
      (a4) connection means to said general cache means to said microcode cache means;
   (b) said general cache means for holding frequently used OPCODES and data words for rapid delivery to a processor means;
   (c) said microcode cache means for holding frequently used microcode words for providing routines for the execution of selected OPCODES by said processor means; and includes:
      (c1) a plurality of microcode-address storage means holding addresses of microcode instruction words being held in a plurality of microcode-data word means;
      (c2) a plurality of comparator means for comparing an incoming requested address, from said processor means, with addresses in said plurality of microcode-address storage means and including:
         (c2a) means to generate a hit signal to a specific location in one of said plurality of microcode-data word means, said location holding a requested microcode instruction word;
      (c3) said plurality of microcode data word means holding said microcode instruction words and transmitting the requested microcode instruction word to a control register means in one clock cycle after the occurrence of said hit signal;
      (c4) a use-sensing means to register microcode address locations of less recently used microcode instruction words and including:
         (c4a) means to replace less recently used microcode addresses and the corresponding microcode instruction words with more recently used microcode addresses and microcode instruction words;
         (c4b) a least recently used logic unit for sensing least recently used microcode-addresses in said plurality of microcode-address storage means including:
            (c4b1) means to convey said least recently used addresses to a microcode cache state machine;
         (c4c) a least recently used microcode-address storage means having means for tagging each associated microcode instruction word as valid or invalid, said least recently used microcode-address storage means for holding the least recently used microcode-addresses including:
            (c4c1) means to convey said at least recently used addresses to said least recently used logic unit;
         (c4d) said microcode cache state machine for controlling the loading of said microcode-address storage means, and the loading of said microcode-data word means at those locations sensed by said least recently used logic unit, and including:
            (c4d1) means for executing a microcode word fetch from said main memory sub-system, if a miss occurs during a microcode instruction word request from said processor means to said microcode cache means,
            (c4d2) means to place said fetched microcode word address and said microcode word in said locations sensed as least recently used;
      (c5) a control register means for holding the requested microcode information word for access by said processor means;
   (d) said processor means for executing selected OPCODES by accessing in one clock cycle, addressed microcode instruction words available in said microcode cache means;
   (e) wherein each said system interface means, said general cache means, said microcode cache means and said processor means are implemented on a single chip.

2. The system of claim 1 wherein said general cache means and said microcode cache means includes:
   (i) means to discard the least recently used OPCODE words and least recently used microcode instruction words;
   (ii) means to replace said discarded words with more recently used words.

3. The system of claim 1 wherein said general cache means includes:
   (b1) general address storage means for holding addresses of words residing in an associated general data storage means and including:
      (b1a) means for tagging each associated OPCODE word or data word as being valid or invalid;
   (b2) general data storage means for holding frequently used OPCODE words and data words;
   (b3) status means for selecting for replacement, those words determined to be least recently used;

(b4) a general register file means for receiving requested OPCODE words and data words from said general data storage means for said processor means.

4. The system of claim 3 wherein said general cache means includes:
- (b4) comparator means for comparing a requested address, from said processor means, with addresses in said general address storage means;
- (b5) means for generating a hit signal to said general data storage means when said requested address matches an address in said general address storage means.

5. An on-chip processor system having an internal dual cache memory means and providing an interface between a processing unit and external main system memory which holds a control store for supplying data and microcode instruction words to a general cache and microcode cache memory means, said system comprising:
- (a) a general cache memory means for holding frequently used OPCODES and data words for rapid delivery to a said processing unit;
- (b) microcode cache memory means for holding frequently used microcode instruction words for enabling access to and enabling execution of selected microcode words by said processing unit;
wherein said microcode cache memory means includes:
  - (b1) a plurality of microcode-address storage means holding addresses of microcode instruction words being held in a plurality of microcode word means;
  - (c2) a plurality of comparator means for comparing an incoming requested microcode address with addresses in said plurality of address storage means and including:
    - (c2a) means to generate a hit signal to an addressed location in one of said plurality of microcode word means, said location holding a requested microcode instruction word;
  - (c3) said plurality of microcode word means holding said microcode instruction words and transmitting the requested microcode instruction word to a control register means;
  - (c4) a use-sensing means to register address locations of less recently used data words and including:
    - (c4a) means to replace less recently used addresses and microcode words with more recently used addresses and microcode words;
    - (c4b) means to replace non-valid microcode instruction words before replacing less recently used microcode words;
    - (c4c) a least recently used logic unit for sensing least recently used microcode addresses in said plurality of microcode address storage means;
    - (c4d) a least recently used microcode address storage means for holding the least recently used microcode addresses as information to a microcode cache state machine;
    - (c4e) said microcode cache state machine for controlling the loading of said microcode address storage means, said microcode instruction word means, and for executing a fetch from said main memory if a miss occurs during a microcode instruction word request from said microcode cache memory means;
  - (c5) said control register means for holding the requested microcode information word for access by said processing means in one clock cycle;
- (c) system interface means for enabling communication between said external main memory and said general and said microcode cache memory means;
- (d) said processing unit for executing selected OPCODE words and microcode instruction words furnished by said general and/or said microcode cache memory means;
- (e) wherein each said processing unit, said system interface means, said microcode cache memory means and said general cache memory means are implemented on a single chip.

6. The system of claim 5 which includes:
- (i) a general tag cache for storing a tag that indicates whether information being requested by said processing means is stored in said general cache memory means and including a status bit indicating the validity or non-validity of said information;
- (ii) a microcode tag cache for storing a tag that indicates whether information being requested by said processor means is stored in said microcode cache memory means and including a status bit indicating the validity or non-validity of said information;
- (iii) first and second hit circuitry means for receiving an information request from said processing unit to determine respectively whether the requested information resides in said general cache memory means or in said microcode cache memory means.

7. The system of claim 5 wherein said general cache and said microcode memory means each include:
- (a) means to function in a bypass mode where said general or said microcode cache memory means will generate a miss signal in all cases to said system interface to access said external main memory;
- (b) means to function in a non-bypass mode where said general cache or said microcode cache memory means receives an address request, said microcode cache receiving an address request on every clock cycle and said general cache memory means receiving a request on every other clock cycle.

8. A single chip processing unit holding frequently used microcode instruction words for access in one clock cycle for executing OPCODES in a general cache means comprising:
- (a) system interface means enabling access to and from a main memory means holding a control store;
- (b) general cache means, connected to said system interface means, for holding OPCODES and data words;
- (c) processor means, connected to said general cache means and to a microcode cache means, said processor means including:
  - (c1) control register means for holding addressed microcode words for execution of OPCODES in said general cache means;
  - (c2) sequencer means for addressing the microcode word associated with each OPCODE selected for execution;
- (d) said microcode cache means including:
  - (d1) a plurality of microcode tag and status RAMs for holding the address and validity status of each microcode word in a plurality of microcode data RAMs;
  - (d2) said plurality of microcode data RAMs for holding frequently used microcode words;
  - (d3) a microcode cache controller state machine means for handling abnormal conditions including:
    - (i) means for generating a freeze signal to stop processor operation when a microcode cache "miss" occurs until the requested word is fetched from said main memory means and placed in said control register means;

(ii) means for generating a request to the said system interface means to fetch a selected microcode word from said main memory means;

(iii) means for generating a signal to said sequencer means to convey the address of a missing microcode word to said microcode tag and status RAMs to update said microcode tag and status RAMs when the missing word has been returned to said microcode data RAM;

(iv) means to select the most frequently used microcode words for storage in said plurality of microcode data RAMs;

(e) wherein said system interface means, said processor means, said general cache means, said microcode cache means and said processor means reside together on a single chip.

* * * * *